(12) United States Patent
Kanik et al.

(10) Patent No.: US 10,962,707 B2
(45) Date of Patent: Mar. 30, 2021

(54) METHOD FOR FORMING THERMAL-RESPONSIVE FIBERS

(71) Applicant: Massachusetts Institute of Technology, Cambridge, MA (US)

(72) Inventors: Mehmet Kanik, Cambridge, MA (US); Polina Olegovna Anikeeva, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/427,540

(22) Filed: May 31, 2019

(65) Prior Publication Data
US 2020/0379166 A1     Dec. 3, 2020

(51) Int. Cl.
| | | |
|---|---|---|
| *C03B 37/027* | (2006.01) | |
| *G02B 6/02* | (2006.01) | |
| *C03B 37/012* | (2006.01) | |
| *C03C 13/04* | (2006.01) | |

(52) U.S. Cl.
CPC .......... *G02B 6/02* (2013.01); *C03B 37/01211* (2013.01); *C03B 37/027* (2013.01); *C03C 13/046* (2013.01)

(58) Field of Classification Search
CPC ....... G02B 6/02; C03B 37/012; C03B 37/027; C03C 13/04
See application file for complete search history.

(56) References Cited

U.S. PATENT DOCUMENTS

2019/0096540 A1 *  3/2019  Baughman .............. B29C 70/14
2020/0361809 A1 * 11/2020  DeMass .............. C03B 37/0253

OTHER PUBLICATIONS

Amjadi et al., "High-performance multiresponsive paper actuators." ACS nano 10.11 (2016): 10202-10210.
Chen et al., "Hierarchically arranged helical fibre actuators driven by solvents and vapours." Nature nanotechnology 10.12 (2015): 1077, 8 pages.
Cheng et al., "A Biomimetic Conductive Tendril for Ultrastretchable and Integratable Electronics, Muscles, and Sensors." ACS nano 12.4 (2018): 3898-3907.
Chun et al., "Hybrid carbon nanotube yarn artificial muscle inspired by spider dragline silk." Nature communications 5 (2014): 3322, 9 pages.
Darwin, The movements and habits of climbing plants. J. Murray, 1875, 67 pages.
Deng et al., "Preparation of biomimetic hierarchically helical fiber actuators from carbon nanotubes." nature protocols 12.7 (2017): 1349, 10 pages.
Gerbode et al., "How the cucumber tendril coils and overwinds." Science 337.6098 (2012): 1087-1091.

(Continued)

*Primary Examiner* — Daniel Petkovsek
(74) *Attorney, Agent, or Firm* — Smith Baluch LLP

(57) ABSTRACT

A method includes drawing a fiber from a set of substances that includes an elastomer having a first thermal expansion coefficient. The set of substances also includes a glassy polymer having a second thermal expansion coefficient that is higher than the first thermal expansion coefficient. The method also includes extending and then releasing, under ambient temperature conditions, the fiber to increase elastic responsiveness of the fiber to thermal actuation.

20 Claims, 32 Drawing Sheets

(56) References Cited

OTHER PUBLICATIONS

Godinho et al., "How to mimic the shapes of plant tendrils on the nano and microscale: spirals and helices of electrospun liquid crystalline cellulose derivatives." Soft Matter 5.14 (2009): 2772-2776.
Godinho et al., "Self-winding of helices in plant tendrils and cellulose liquid crystal fibers." Soft Matter 6.23 (2010): 5965-5970.
Haines et al., "Artificial muscles from fishing line and sewing thread." science 343.6173 (2014): 868-872.
Haines et al., "New twist on artificial muscles." Proceedings of the National Academy of Sciences 113.42 (2016): 11709-11716.
Isogai et al., "Deformation behavior of thermoplastic elastomer specimens: Observation of the strain behavior in a wide range of tensile speeds." Polymer Engineering & Science58.S1 (2018): E151-E157.
Jung et al., "A self-sensing dielectric elastomer actuator." Sensors and Actuators A: Physical 143.2 (2008): 343-351.
Kanik et al., Programmable Artificial Muscles with a Feedback Mechanism in Symposium GI01 Tutorial: An Introduction to Machine Methods for Materials Science. Nov. 25, 2018. Abstract BM08.16.08. 3 pages.
Kanik, Programmable Artificial Muscle With a Feedback Mechanism. 2018 MRS Fall Meeting and Exhibit. Nov. 2018. 53 pages.
Kim et al., "Bio-inspired, moisture-powered hybrid carbon nanotube yarn muscles." Scientific reports 6 (2016): 23016, 7 pages.
Kim et al., "Fast low-voltage electroactive actuators using nanostructured polymer electrolytes." Nature communications 4 (2013): 2208, 9 pages.
Kuhn et al., "ASM Handbook. vol. 8: Mechanical Testing and Evaluation." ASM International, Member/Customer Service Center, Materials Park, OH 44073-0002, USA, 2000. 998 (2000). pp. 26-48.
Lendlein et al., "Biodegradable, elastic shape-memory polymers for potential biomedical applications." Science 296.5573 (2002): 1673-1676.
Lendlein et al., "Light-induced shape-memory polymers." Nature 434.7035 (2005): 879, 4 pages.
Lima et al., "Electrically, chemically, and photonically powered torsional and tensile actuation of hybrid carbon nanotube yarn muscles." Science 338.6109 (2012): 928-932.
Lu et al., "Flexible and stretchable nanowire-coated fibers for optoelectronic probing of spinal cord circuits." Science advances 3.3 (2017): e1600955, 9 pages.
Maziz et al., "Knitting and weaving artificial muscles." Science advances 3.1 (2017): e1600327, 12 pages.
Mirfakhrai et al., "Polymer artificial muscles." Materials today 10.4 (2007): 30-38.
Mirvakili et al., "Fast Torsional Artificial Muscles from NiTi Twisted Yarns." ACS applied materials & interfaces 9.19 (2017): 16321-16326.
Park et al., "Electrically controllable twisted-coiled artificial muscle actuators using surface-modified polyester fibers." Smart Materials and Structures 26.3 (2017): 035048, 9 pages.
Shabahang et al., "Controlled fragmentation of multimaterial fibres and films via polymer cold-drawing." Nature 534.7608 (2016): 529, 15 pages.
Shahinpoor et al., "Ionic polymer-metal composites: I. Fundamentals." Smart materials and structures10.4 (2001): 819, 16 pages.
Yaman et al., "Arrays of indefinitely long uniform nanowires and nanotubes." Nature materials 10.7 (2011): 494, 9 pages.
Yang et al., "The grand challenges of Science Robotics." Science Robotics 3.14 (2018): eaar7650, 15 pages.
Zupan et al., "Actuator classification and selection—the development of a database." Advanced Engineering Materials 4.12 (2002): 933-940.

\* cited by examiner

500A

| 510 | Drawing a fiber from a set of substances, the set of substances including: an elastomer having a first thermal expansion coefficient; and a glassy polymer having a second thermal expansion coefficient that is higher than the first thermal expansion coefficient |

↓

| 520 | Extending and then releasing, under ambient temperature conditions, the fiber to increase elastic responsiveness of the fiber to thermal actuation |

FIG. 5A

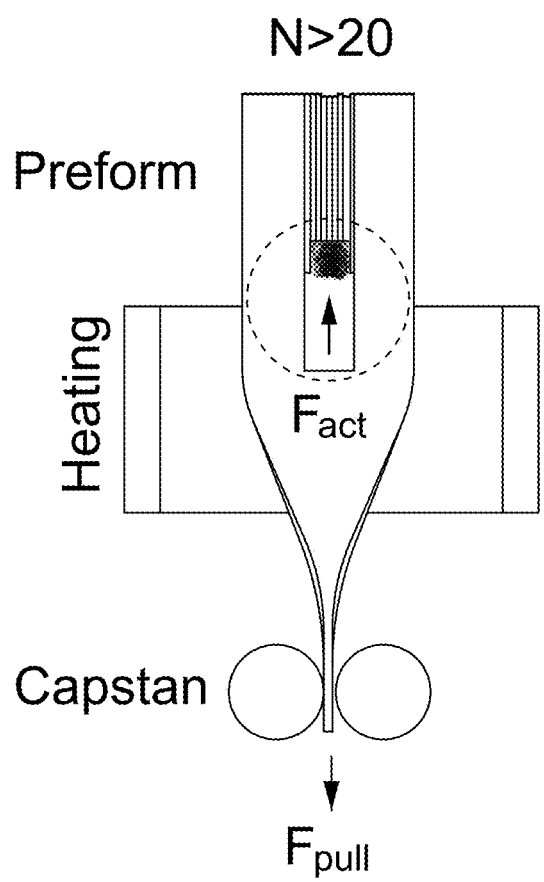
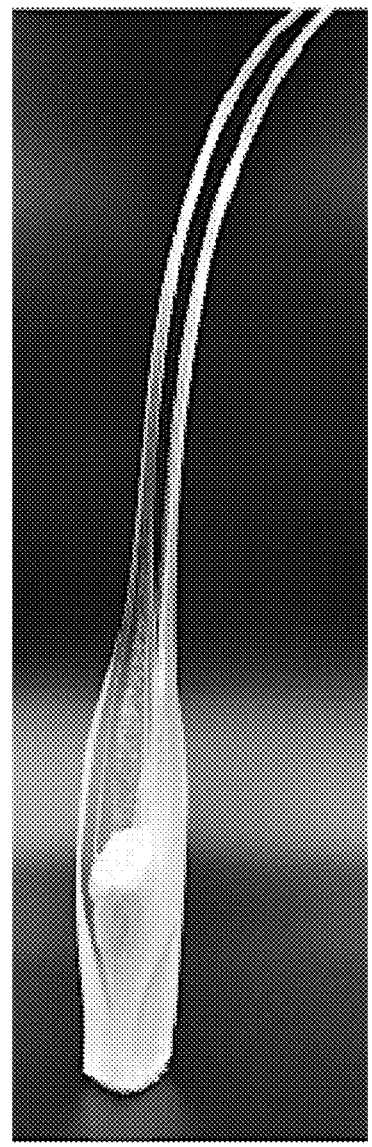
If $F_{act} > F_{pull}$ : Drawing failure
If $F_{act} < F_{pull}$ : Drawing success
FIG. 11A
FIG. 11B PE (Outside)   COCe (Inside)

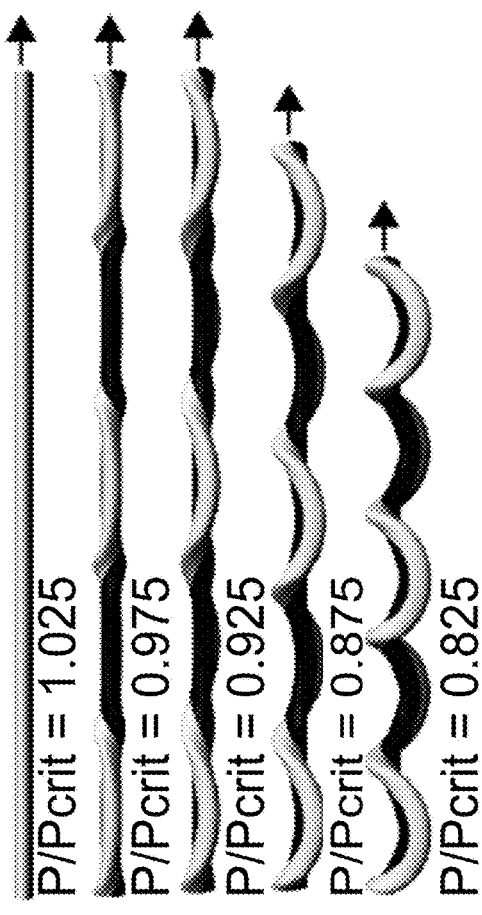
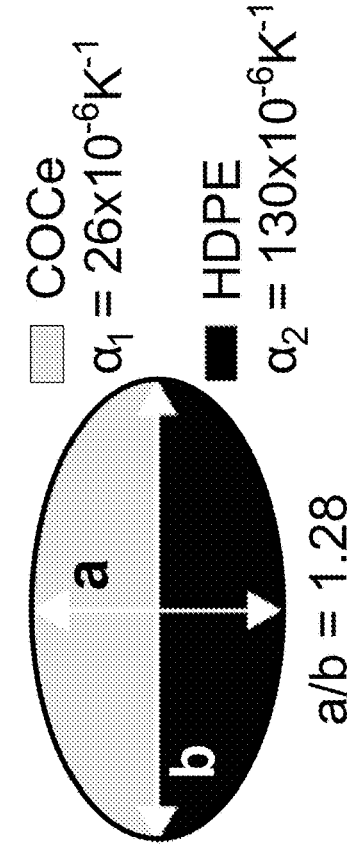
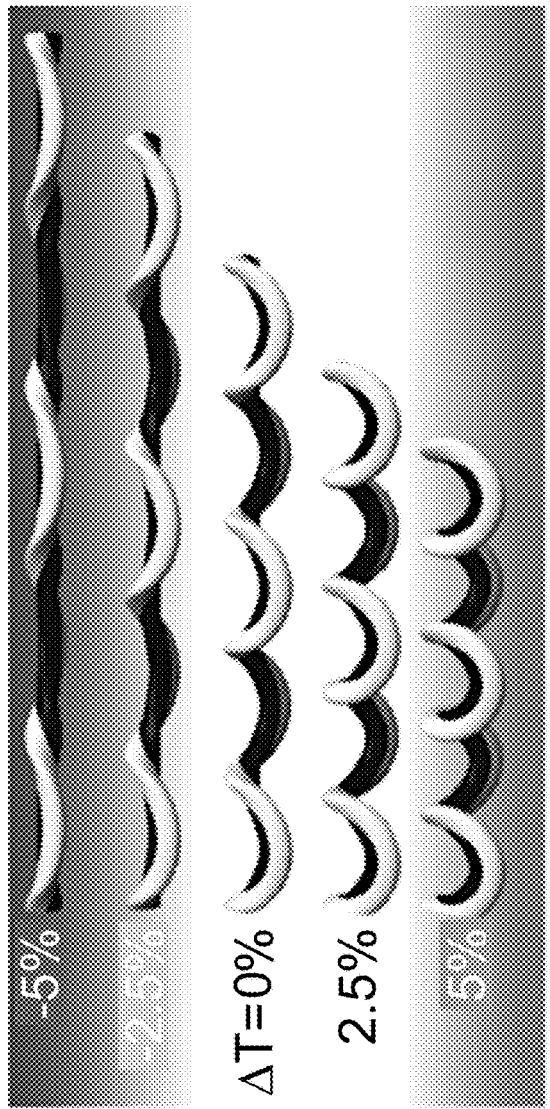
FIG. 14A
FIG. 14B
FIG. 14C

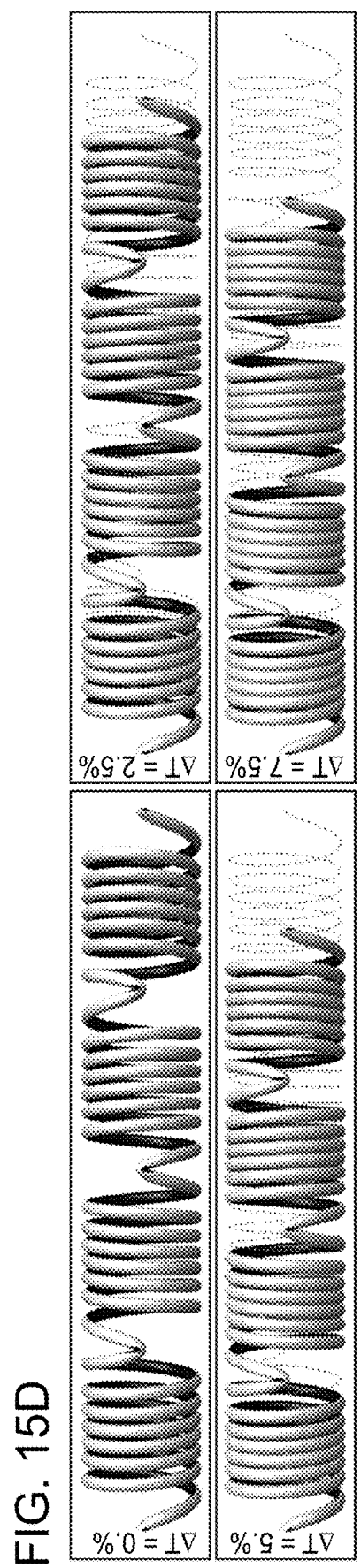

$$\text{Power-to-mass} = \Delta F * \frac{\Delta x}{\Delta t} * \frac{1}{m}$$

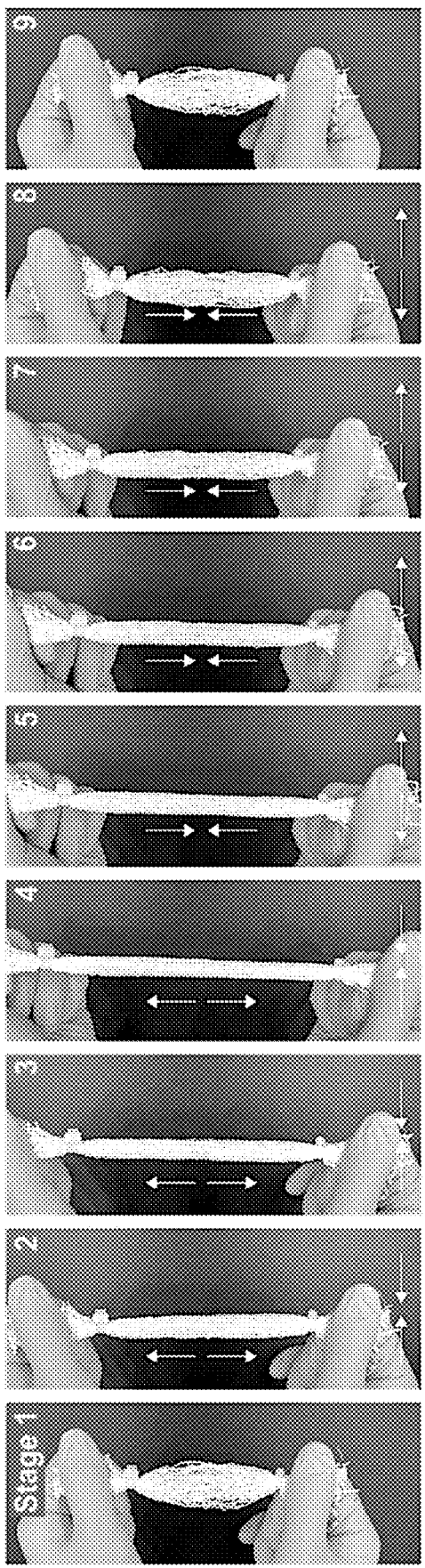
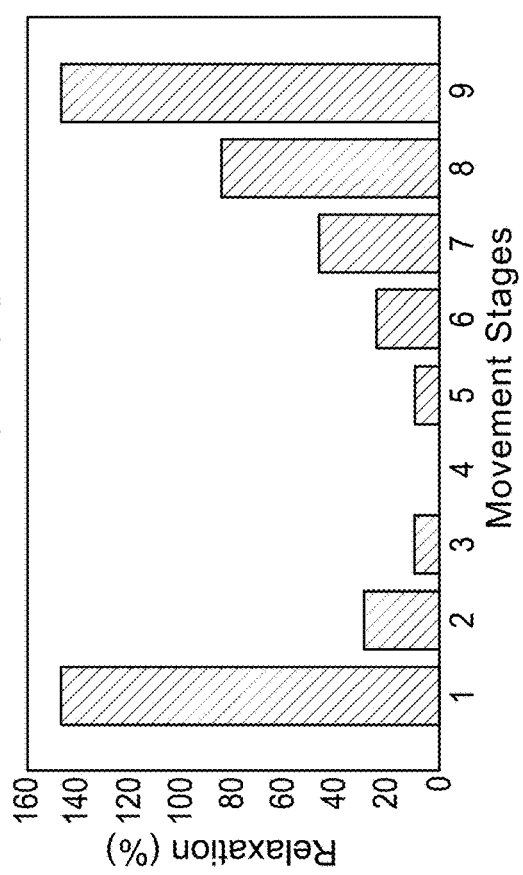
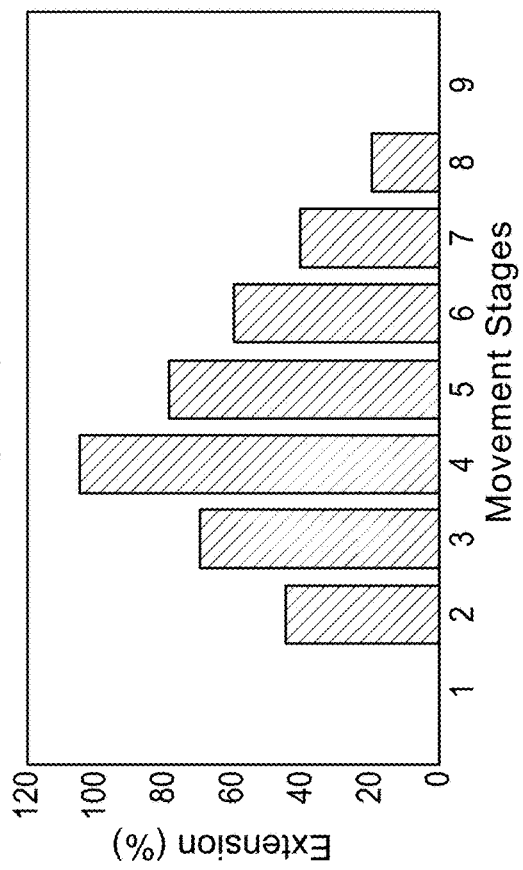
FIG. 19A
FIG. 19B
FIG. 19C

METHOD FOR FORMING THERMAL-RESPONSIVE FIBERS

STATEMENT OF SUPPORT

This invention was made with Government support under Grant No. R01 NS086804 awarded by the National Institutes of Health (NIH), and under Grant Nos. DMR1419807 and EEC1028725 awarded by the National Science Foundation (NSF). The Government has certain rights in the invention.

BACKGROUND

Linear actuators/fibers simultaneously offering high temporal responsiveness, power-to-mass ratio, and strain and capable of operating across micrometer to centimeter spatial scales are poised to advance the fields of robotics, prosthetic limbs, and transportation, especially when used to construct artificial muscles. Although advances in polymer-based actuators have delivered unprecedented strengths, producing these devices at scale with tunable dimensions remains a challenge.

Specifically, although actuators based on shape-memory alloys, stimuli-responsive polymers, and carbon composites offer light-weight, compact, and cost-effective alternatives to traditional hydraulic, pneumatic, and servo designs, their temporal responsiveness remains limited. Recent research in polymer and composite actuators has drawn inspiration from cucumber tendrils that rely on differential swelling within their compartments to achieve high power-to-mass ratios and strains. The ability to produce such structures at scale with tunable dimensions, however, remains limited. Furthermore, existing fiber-based artificial muscles are generally unable to achieve low-latency linear actuation without features like secondary transduction and/or integration of feedback mechanisms.

SUMMARY

A method includes drawing a fiber from a set of substances that includes an elastomer having a first thermal expansion coefficient. The set of substances also includes a glassy polymer having a second thermal expansion coefficient that is higher than the first thermal expansion coefficient. The method also includes extending and then releasing, under ambient temperature conditions, the fiber to increase elastic responsiveness of the fiber to thermal actuation.

A method includes drawing a first fiber from a preform including applying heat to the preform during the drawing of the first fiber. The preform includes a first slab of an elastomer having a first thermal expansion coefficient, and a second slab of a glassy polymer having a second thermal expansion coefficient that is higher than the first thermal expansion coefficient. The preform also includes a cladding layer encapsulating the first slab and the second slab. The method further includes drawing a second fiber from the first fiber, including applying heat to the first fiber during the drawing of the second fiber. The method also includes extending and then releasing, under ambient temperature conditions, the second fiber to increase elastic responsiveness of the fiber to thermal actuation, including simultaneously releasing both ends of the second fiber to avoid the formation of perversions.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 5A is flowchart illustrating a method of making a thermal-responsive fiber.

FIG. 11A illustrates how, in the second fiber drawing step, the first-step fibers were stacked and redrawn. However, the number of fibers amenable to this process is limited. When the number of first step fibers exceeded ~20 in the second step preform, the first step fibers contracted very strongly and broke the preform upon exposure to the elevated drawing temperature.

FIG. 11B illustrates a broken preform due to thermal actuation of the fibers.

FIG. 14A is an illustration of the cross-sectional area of the bimorph used in applying Kirchhoff's theory of thin rods to the fibers.

FIG. 14B illustrates bifurcation of a bimorph fiber upon lowering the applied tensile strain below a threshold value, leading to the formation of perversions.

FIG. 14C is a physical model of a bifurcated fiber 5 from FIG. 14B, contracting in response to a thermal stimulus.

FIG. 15D illustrates how post-solution algebraic manipulation allows emulation of shapes close to those obtained experimentally, which, further, curl/unwind similarly under a temperature differential.

FIG. 19A shows photos of an artificial fiber muscle bundle during the extension and release processes, in stages 1-9.

FIG. 19B is a plot of the percentage values for the extension for deformation stages 1-9 (B, C) of the artificial muscle bundle of FIG. 19A.

FIG. 19C is a plot of the percentage values for the relaxation for deformation stages 1-9.

DETAILED DESCRIPTION

Following below are more detailed descriptions of various concepts related to, and implementations of methods for making fibers responsive to temperature changes. Concepts introduced above and discussed in greater detail below may be implemented in numerous ways. Examples of specific implementations and applications are provided primarily for illustrative purposes to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

As used herein, the term "elastomer" and variants thereof refer to any polymer that displays rubber-like elasticity, and includes thermoplastic elastomers that comprise a thermoreversible network. This definition is similar to that of "elastomer" and "thermoplastic elastomer" provided by the International Union of Pure and Applied Chemistry (IUPAC). Generally, elastomers can be characterized as polymers exhibiting viscoelasticity. Non-limiting examples of elastomers useful for making thermal-responsive fibers can include, but are not limited to, a cyclic olefin copolymer elastomer (COCe), a thermoplastic polyurethane, and poly (styrene-butadiene-styrene), derivatives thereof, and/or the like.

As used herein, the term "glassy polymer" and variants thereof refer to any amorphous, solid polymer that has a glass transition temperature $T_g$ greater than about 50° C. and/or a melting temperature $T_m$ greater than about 80° C. Non-limiting examples of glassy polymers useful for making thermal-responsive fibers can include, but are not limited to, polyethylene, chlorinated polyethylene, a polysulfone, a polyether sulfone, polyphenylsulfone, a polycarbonate, polyvinylidene fluoride, a polyurethane, and/or the like.

Figure 7:
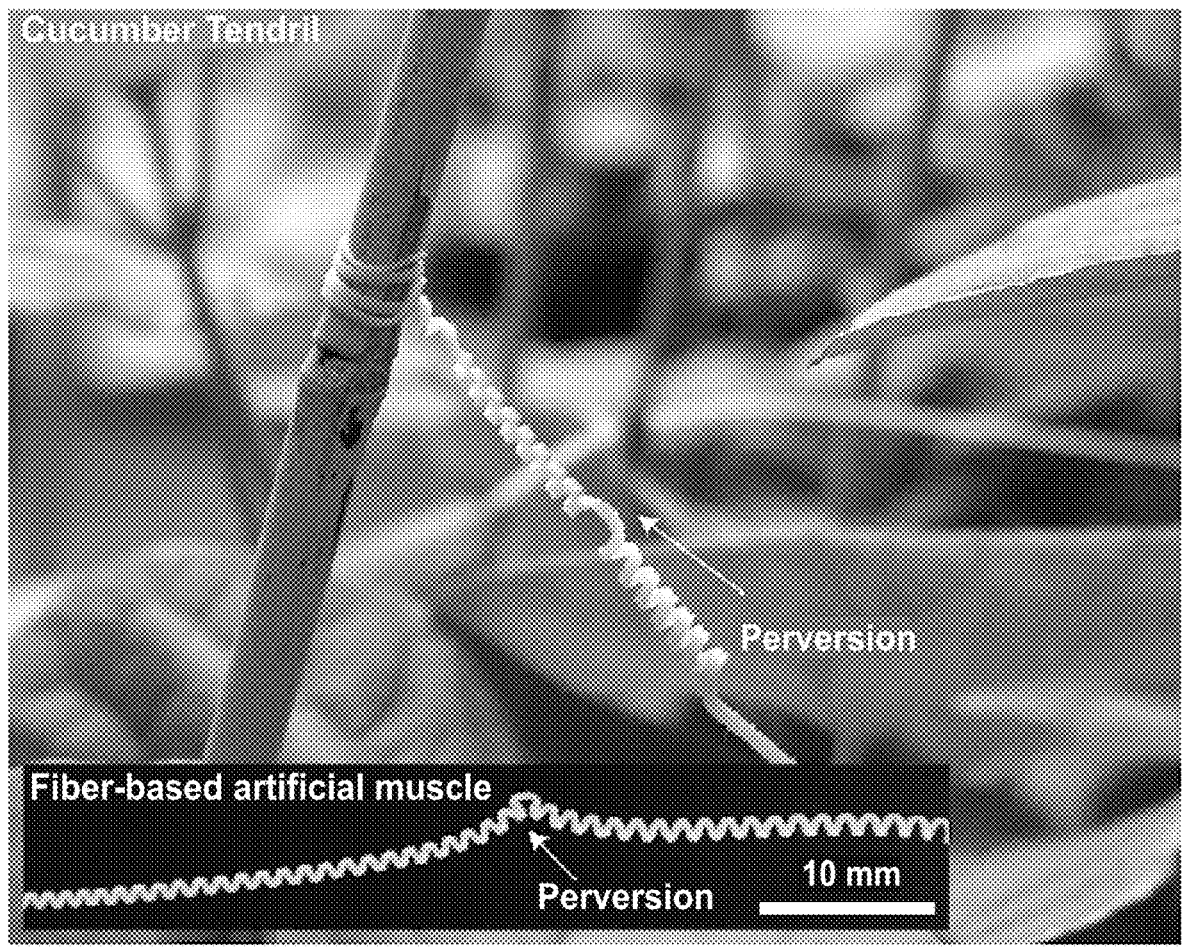
FIG. 7 illustrates tendril perversions. A comparison of cucumber tendril and fiber muscles is shown.

Without being bound by any theory in particular, it is reasoned that differential thermal expansion within polymer bimorph (i.e., with two polymers) structures/fibers that include an elastomer and a glassy polymer amplified by tendril-like spring geometry (FIG. 7) could allow for linear actuation at low thermal stimuli, e.g., be responsive to small fluctuations in temperature. While described herein with reference to a bimorph structure with two polymers, it is understood that more than two layers can be employed as long as the resulting design exhibits the differential thermal expansion coefficient features described herein.

To produce such fibers with arbitrary lengths and lateral dimensions ranging from microns to millimeters, a scalable fiber drawing process as detailed herein can be employed. Thermal drawing enables lateral size reduction of preforms, which are macroscopic models of the desired fibers, by factors of $10$-$10^5$ via controlled application of heat and tension while simultaneously delivering meters to kilometers of fiber. Unlike other fiber fabrication techniques such as electro- and jet-spinning, thermal drawing is applicable to multiple materials with a diversity of geometries, including cylindrical and non-cylindrical cross-sections. The viscosity of each layer and/or material can be from about 0.1 Pascal-second (Pa·s) to about $10^4$ Pa·s when in the molten state, including all values and sub-ranges in between. For better compatibility with thermal drawing, the layers of the bimorph can be composed of materials with similar viscosities (e.g., the viscosity of the elastomer can be within 25% of the viscosity of the glassy polymer, and/or vice versa) at the drawing temperature. Simultaneously, increasing the differences in thermal expansion coefficients (a) can be useful to achieve robust actuation. For ease of explanation, the glassy polymer polyethylene (PE, melting temperature $T_m$=120° C., linear expansion coefficient $\alpha=1.3\times10^{-4}$ K$^{-1}$) and the elastomer cyclic olefin copolymer elastomer (COCe, melting temperature $T_m$=84° C., $\alpha=2.6\times10^{-5}$ K$^{-1}$) are used to explain a fiber drawing process, and were chosen as the constituents of the bimorph fibers (Table 1).

Figure 8A:
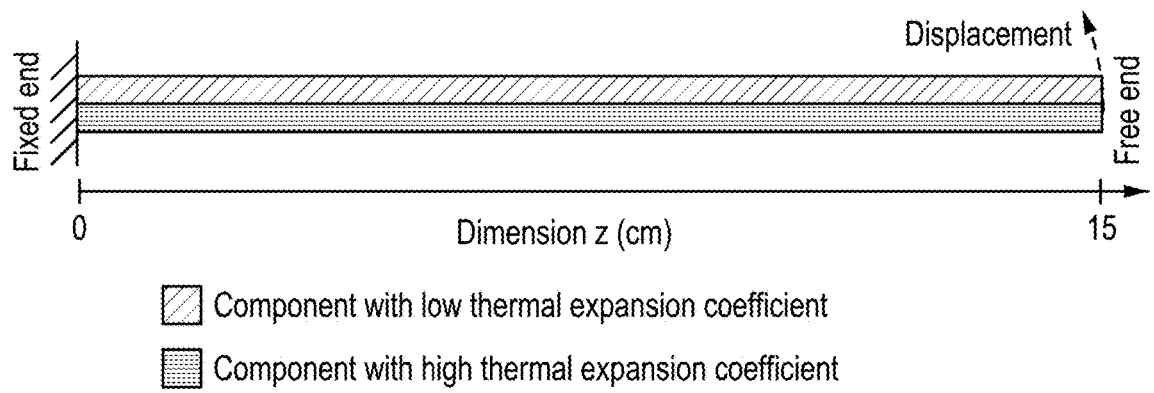
FIG. 8A illustrates a COMSOL simulation setup for bending fiber geometries. A high thermal expansion coefficient and a low thermal expansion coefficient materials were used in the bimorph structure to observe the thermal actuation. After a temperature increase from room temperature to 60° C. in our stationary model, the displacement of the free end of the fiber was measured.
Figure 8B:
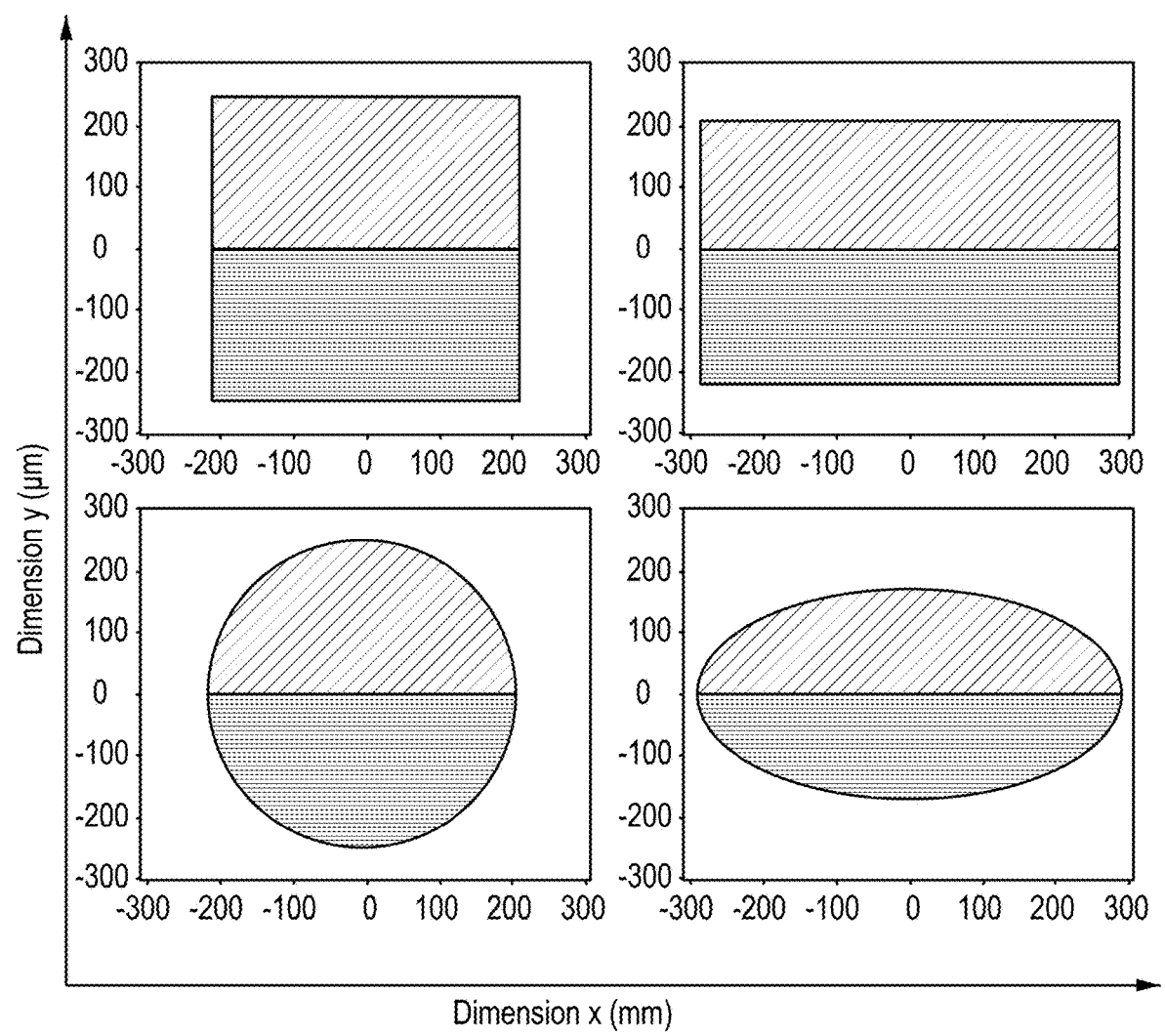
FIG. 8B illustrates an investigation of the effect of the cross-section in actuator design using 3D simulations. Square, rectangular, elliptic, and circular cross-sectional fibers were used, which are composed of COCe and PE in halves. Each cross-sectional design had 10 an equal cross-sectional area of 0.25 mm$^2$. The highest actuation performance was achieved with rectangular and elliptical cross-sectional designs (Table 2).

As further detailed in the Example below, finite element analysis can be applied to select a cross-sectional geometry that would optimize the thermal responsiveness of the bimorph fibers (FIGS. 8A-8B and Table 2). The final design of the bimorph fibers can include identical PE and COCe layers with rectangular cross sections. Solely for ease of explanation, the fiber drawing process is explained with cross-reference to the Example as well.

Figure 1A:
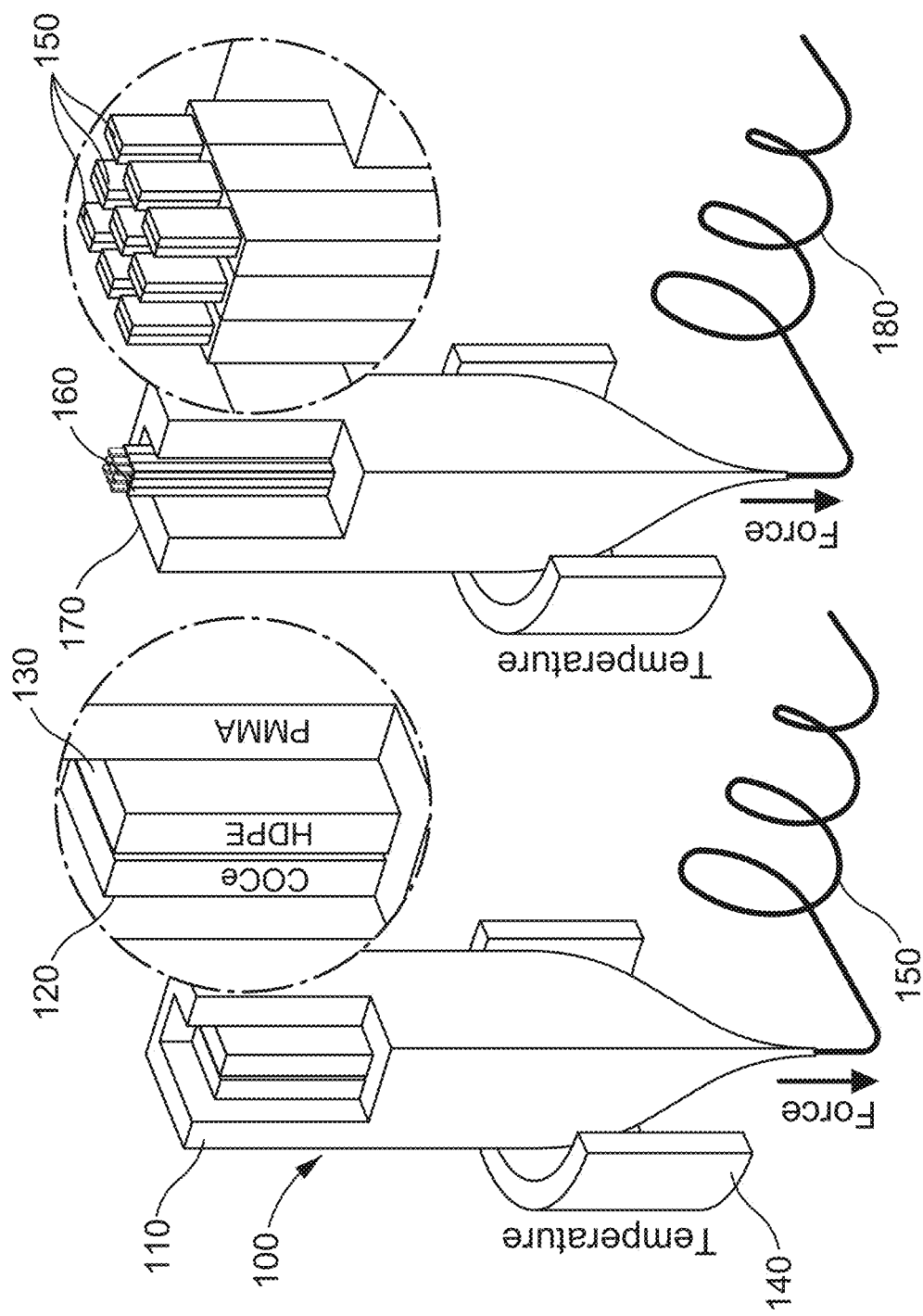
FIG. 1A illustrates bimorph fibers for fiber-based artificial muscle produced via two-step thermal drawing. HDPE=high density PE.
Figure 9:
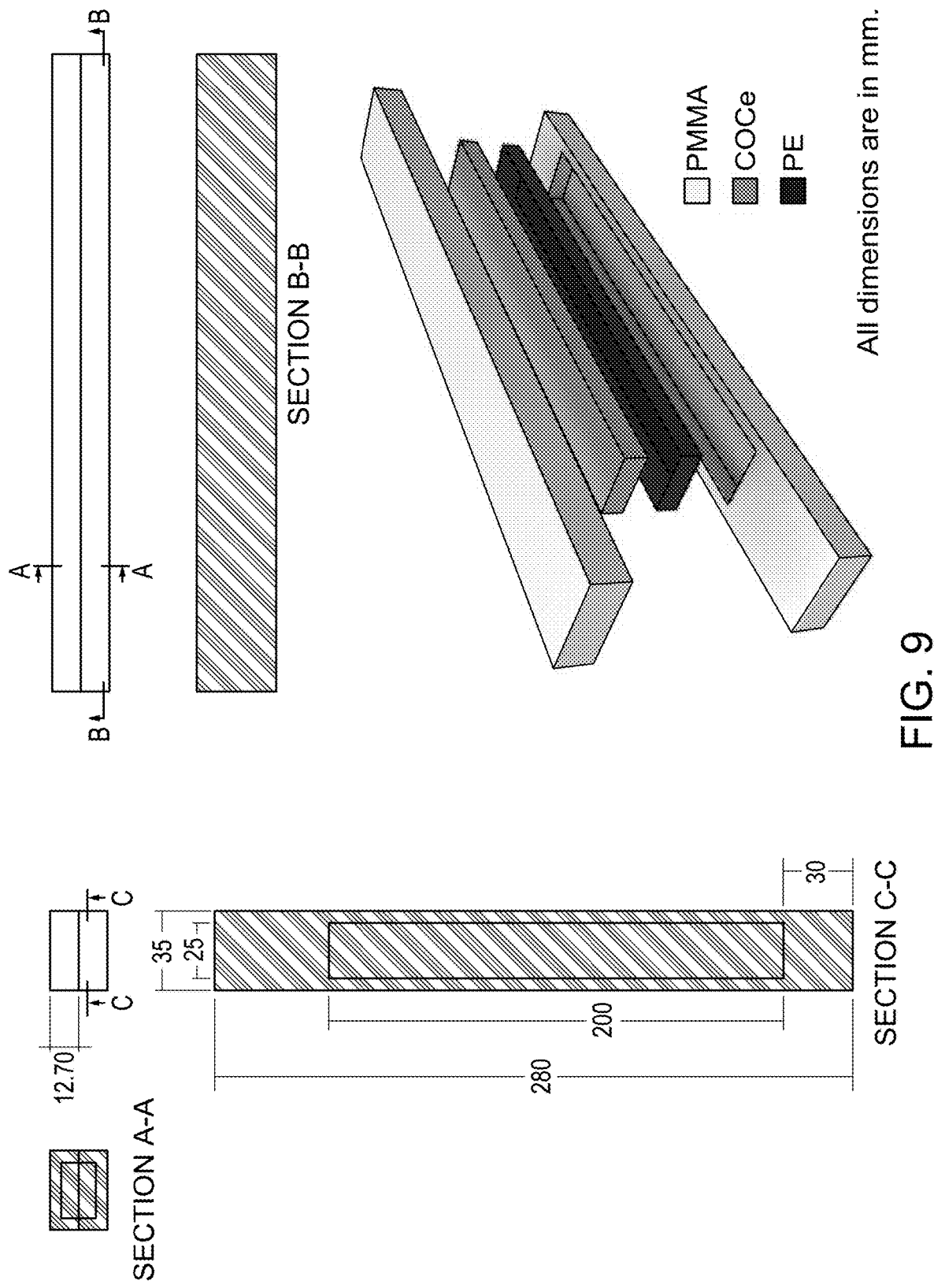
FIG. 9 illustrates a preform design for muscle fiber fabrication. COCe and PE slabs were sized down to 8 mm×25 mm×200 mm and the PMMA cladding was machined for sandwiching the combined COCe and PE slabs. Later, the structure was consolidated at 125° C. for 4 hours under 50 bar pressure in a hot press.

FIG. 1A illustrates how a fiber 150 (also sometimes referred to as a first fiber) can be drawn from a preform 100 composed of COCe 120 and high-density PE 130 blocks. Generally, the preform 100 can have a thickness (e.g., a first cross-sectional dimension) from about 1 mm to about 40 mm, a width (e.g., a second cross-sectional dimension) from about 1 mm to about 40 mm, and a length from about 5 mm to about 400 mm, including all values and sub-ranges in between. As an example, the preform 100 can have a cross section of about 25 mm×8 mm and be about 200 mm long. The COCe and PE block can be joined within a poly(methyl methacrylate) (PMMA) cladding material/layer 110. (FIGS. 1A, 9). The resulting preform 100 can have an outer cross-sectional area with a thickness (e.g., a first cross-sectional dimension) from about 5 mm to about 45 mm, and a width (e.g., a second cross-sectional dimension) from about 5 mm to about 45 mm, including all values and sub-ranges in between. As an example, the resulting preform 100 can have an outer cross-sectional area of about 35 mm×26 mm.

Prior to drawing the preform to form the first fiber 150, the preform 100 can be annealed and temperature treated to promote adhesion between the PE and COCe layers. As an example, the preform can be annealed under a pressure of about 50 bar and a temperature of about 125° C. The preform can then be drawn under predetermined settings to obtain a desired cross-sectional area of the first fiber. For example, by setting the drawing temperature (e.g., via a heating zone 140) to about 290-310° C., a relative feed speed of $v_r=1$ mm/min for the preform, and a draw speed of $v_d=2\text{-}3$ m/min for the fiber, the cross-sectional area of the first fiber can be tuned to between 50 μm×35 μm and 5 mm×3.5 mm over a 500 m length (FIG. 1B). Generally, the drawing temperature can be from about 250° C. to about 340° C.; the relative feed speed $v_f$ can be from about 0.1 mm/min to about 4 mm/min; the draw speed $v_d$ can be from about 0.1 m/min to about 5 m/min, and the length of the first fiber can be from about 1 m to about 10000 m, including all values and sub-ranges in between. This example process can deliver fibers at a cost of ~1 ¢/m at a rate of >120 m/hr.

Figure 10:
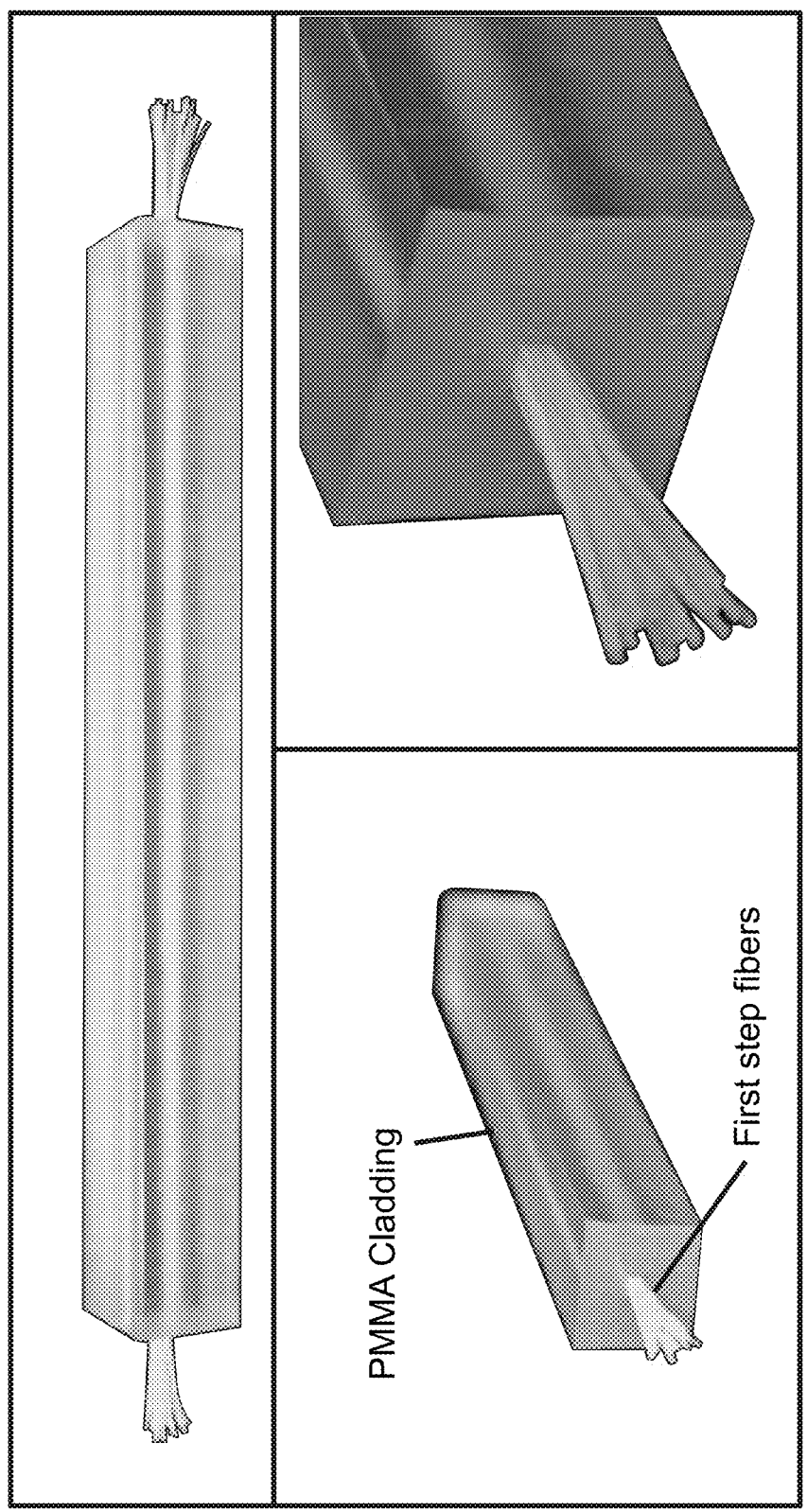
FIG. 10 is a picture of a preform design for the second step fiber drawing. The preform was prepared using a similar technique and dimension to those given in FIG. 9. A 2 mm by 4 mm channel was machined along the center line of each of two PMMA slabs. The PMMAs were consolidated using a hot press (<50 bar pressure, 125° C., 4 hours). The first step fibers were cut into 300 mm lengths and stacked in the second preform. Before the fiber drawing process, both ends of the preform were sealed using a hot air gun.

To further reduce the lateral dimensions, FIG. 1A also illustrates how a set of first fibers 160 produced by a first drawing step can be stacked within another cladding material/layer 170, such as another PMMA cladding, to form a second-step PMMA preform (also referenced with reference character 160), and drawn under similar conditions of drawings temperature, draw speed, etc. as noted above to produce a set of second fibers 180 of COCe/PE bimorph elements. The cross-sectional area of each second fiber is smaller than the cross-sectional area of the corresponding first fiber. For the example process detailed here, the cross-sectional area of each second fiber can be as low as 13λ8 μm² (FIGS. 1A, 10).

The set of first fibers can include at least 1 first fiber, and up to 400 first fibers. In some cases, the thermomechanical mismatch between the elastomer and the glassy polymer making up the fibers can factor into deciding on the number of first fibers in the second-step PMMA preform. In the example here, the thermomechanical mismatch (i.e., the difference in the response to the same thermal stimulus, such as different expansion rates and/or extents, expansion in one material vs. the second material, and/or the like) between COCe and PE can set an upper limit of processing 20 first/first-step fibers for every second second-step PMMA preform. As explained below, increasing the number of fibers ad hoc can result in failure of the preform due to thermal actuation of the fibers (FIGS. 11A-11B).

Figure 1C:
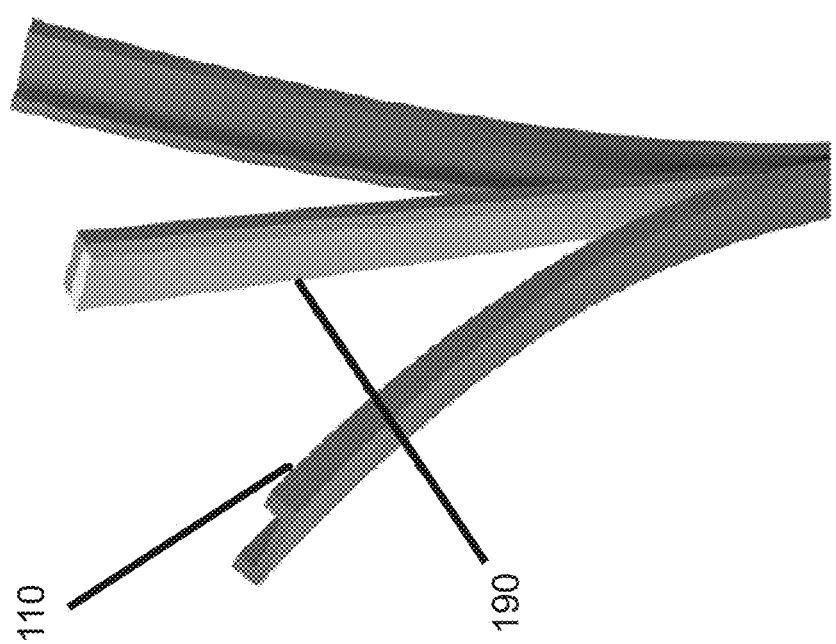
FIG. 1C is an illustration of the PMMA cladding removal.
Figure 1B:
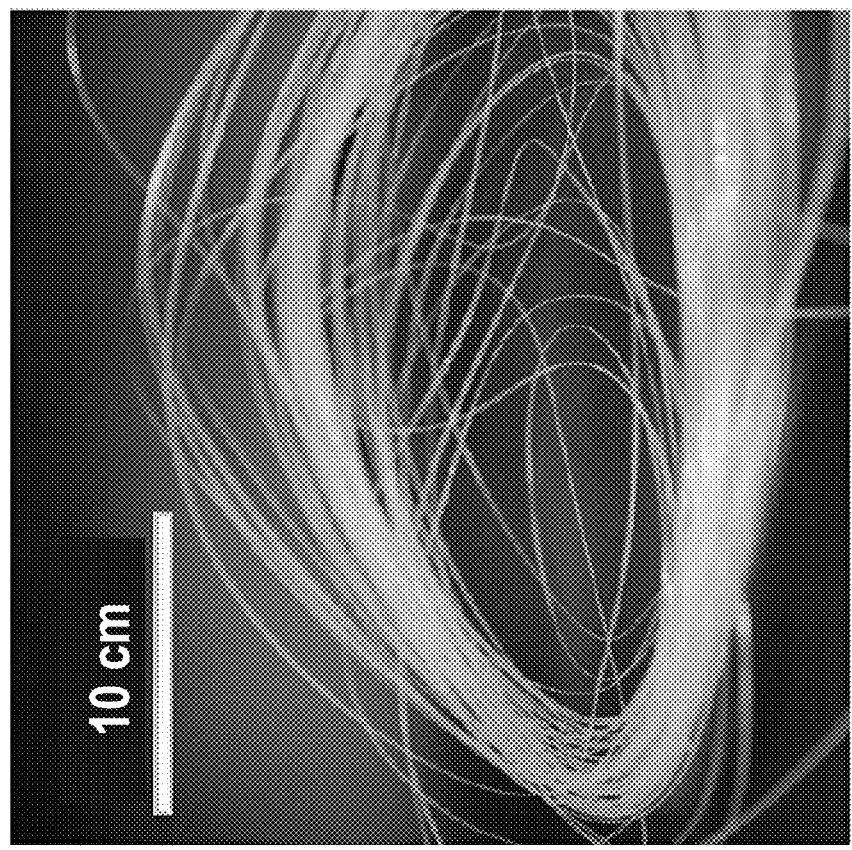
FIG. 1B is a photograph of ~60 m of PMMA (Poly(methyl methacrylate)) encapsulated bimorph fibers.

Following the second drawing, all layers of the cladding (i.e., of the second step preform, as well as of each individual first-step fiber) can be stripped using any suitable means (mechanical, chemical, etc.) to release each second fiber 190 of the set of second fibers 180 (FIG. 1C). The tension (e.g., about 70-100 mN during a typical draw, including all values and sub-ranges in between) experienced by the second fibers during drawing can lead to the formation of a spring-like shape of each second fiber upon cladding removal (e.g., with a coil diameter ~30-40 mm; see FIGS. 12A-12B).

Figure 1D:
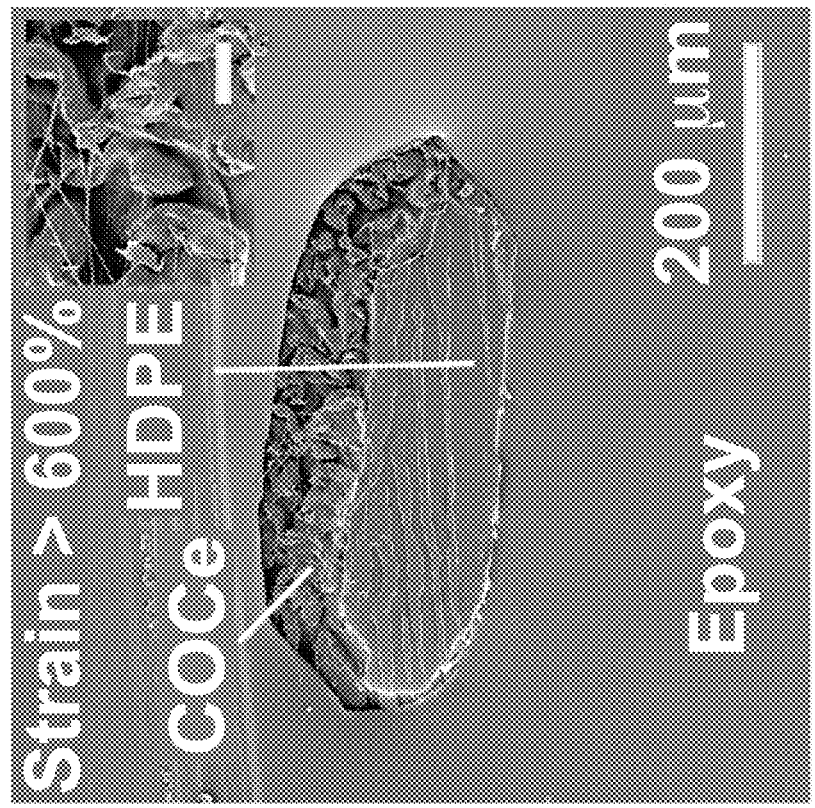
FIG. 1D shows cross-sectional scanning electron microscope (SEM) images of a 5-fiber artificial muscle prior to and following cold drawing.
Figure 1D:
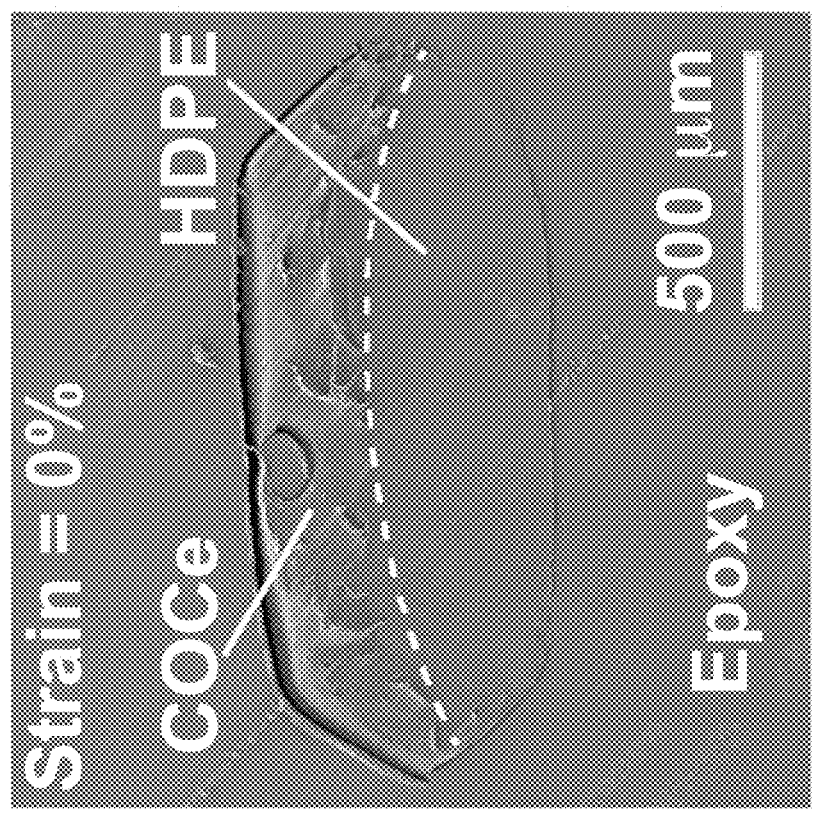

To produce actuated spring-like behavior via strain programming from each bimorph second fiber, the second fiber can be cold drawn at strains of about 50-1300% (including all values and sub-ranges in between), which induce plastic deformation in the glassy polymer, e.g., in PE (FIG. 1D). Said another way, the PE component is permanently distorted as a result of the cold drawing. Cold drawing can generally be characterized as extending (to induce strain) and then releasing the fiber under ambient conditions, i.e., without any application of heat beyond that provided by the environment of the fiber. Generally, the second fibers reach ambient temperatures within a few seconds of the second drawing, and the cold drawing process can be carried out then, or any time thereafter.

Figure 1E:
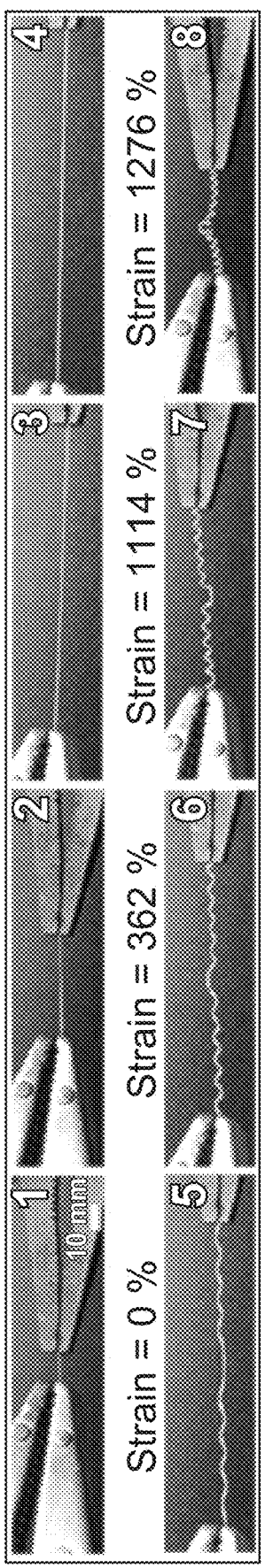
FIG. 1E shows a cold drawing process to obtain a spring actuator. Steps 1 to 4 show the stretching process. Upon release, shown in steps 5 to 8, the fibers formed springs.

Without being limited by any particular theory, upon such releasing, the elastomeric component (e.g., COCe) can attempt to contract to its original dimensions, and the resulting stress in the second fiber can induce the formation of tendril-like springs (still referred to as second fibers) (FIG. 1E).

Figure 1F:
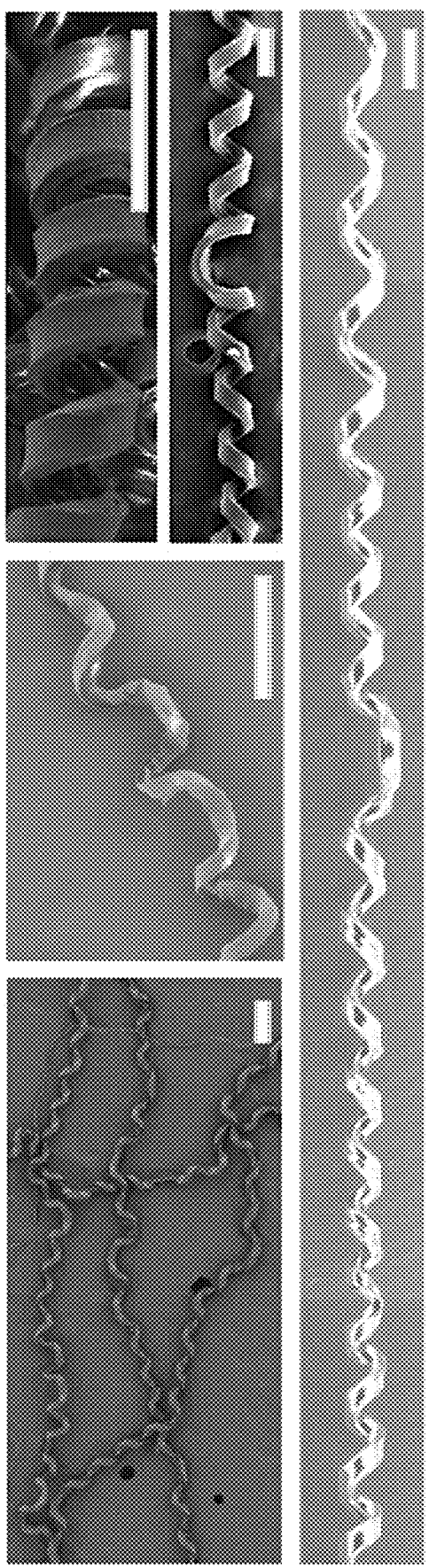
FIG. 1F shows micrographs of first-step and second-step artificial muscles (scale bars: 200 µm).
Figure 1G:
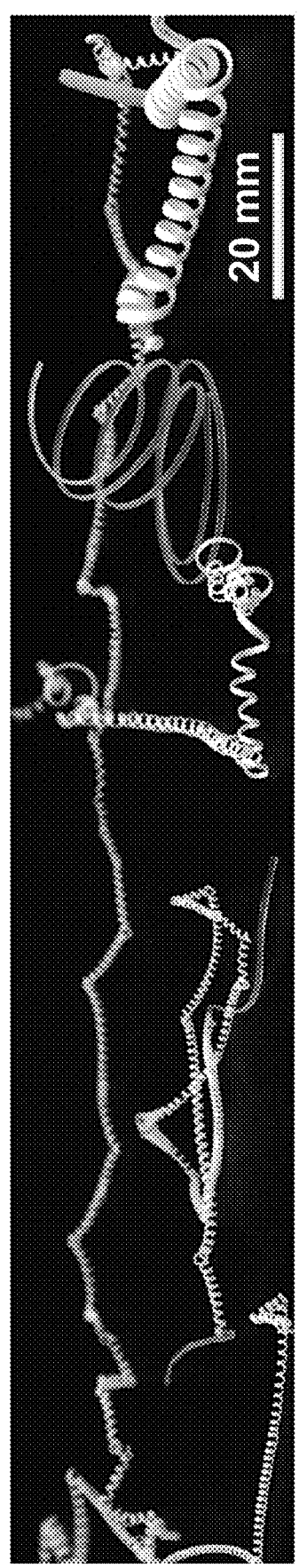
FIG. 1G shows photographs of the first-step and second-step artificial muscles in FIG. 1F.

In some cases, it is possible that relatively higher values of strains during the cold draw process, between ~700-1300%, are tolerated by a subset of fibers but not all fibers, likely due to manufacturing related-aspects. The diameter of springs/fibers obtained in this manner can scale with the cross-sectional dimensions of the fibers/preforms of prior draws; accordingly, a varied set of springs of differing cross-sectional areas could be obtained from the first and second draws as described herein (FIGS. 1F-1G, also see Example below).

Figure 1H:
FIG. 1H shows a fiber-based muscle contracting in response to temperature increase of $\Delta T=14°$ C. (spring index: k=4.70, 6 turns/cm).
Figure 1H:
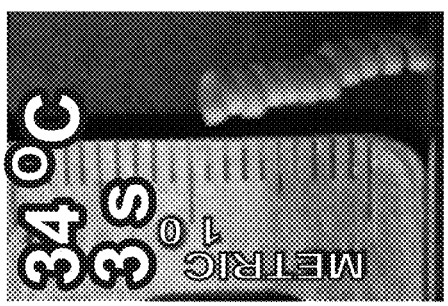
Figure 1H:
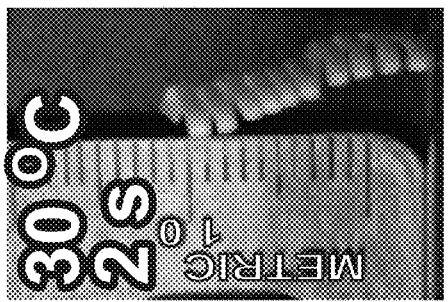
Figure 1H:
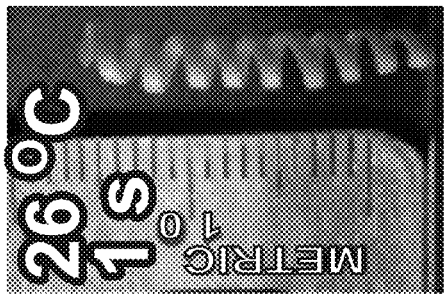
Figure 1H:
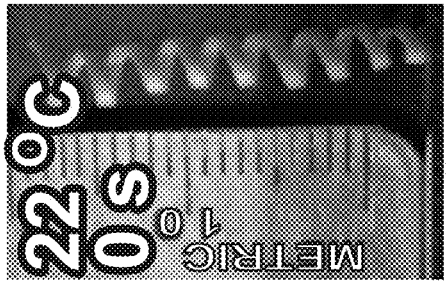

A mismatch in the coefficients of thermal expansion between the elastomer and the glass polymer can lead to increased responsiveness to thermal actuation of these fiber springs/second fibers after cold drawing. In the example of the COCe/PE second fibers here, the five-fold mismatch in coefficients of the thermal expansion between the COCe and PE means that upon temperature increase, the PE layer of the fiber undergoes greater thermal expansion relative to the COCe layer of the fiber, which increases the tensile strain in COCe and induces further tightening of the second fiber (e.g., see FIGS. 13A-13B). FIG. 1H demonstrates, for the example COCe/PE second fiber described here, a 50% linear contraction in a fiber with a 0.64 mm×1 mm cross-sectional area in response to a temperature increase of ΔT=14° C. applied over 4 s.

Figure 15A:
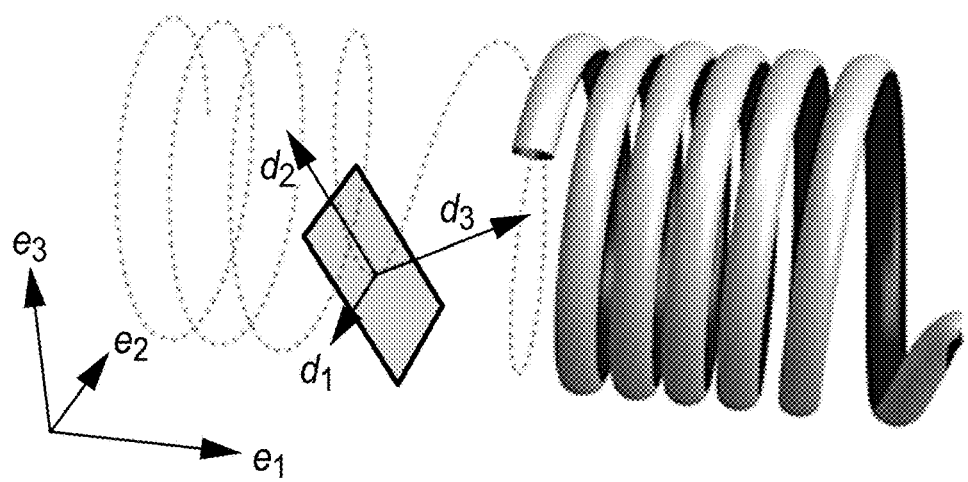
FIG. 15A shows a Frenet-Serret frame coordinate system applied on the elastic rod, showing local director basis.
Figure 15B:
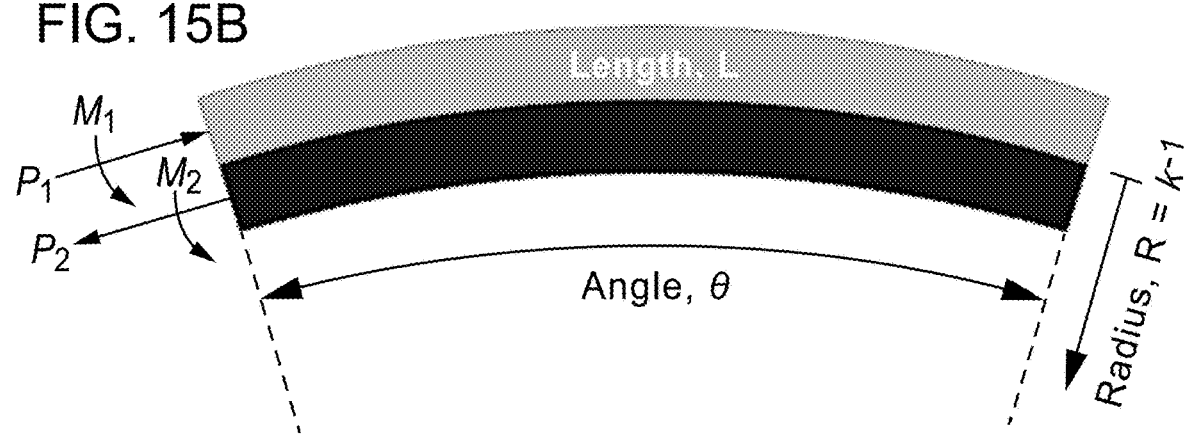
FIG. 15B illustrates angular and linear forces on a naturally curved bilayer of length L and curvature κ.
Figure 15C:
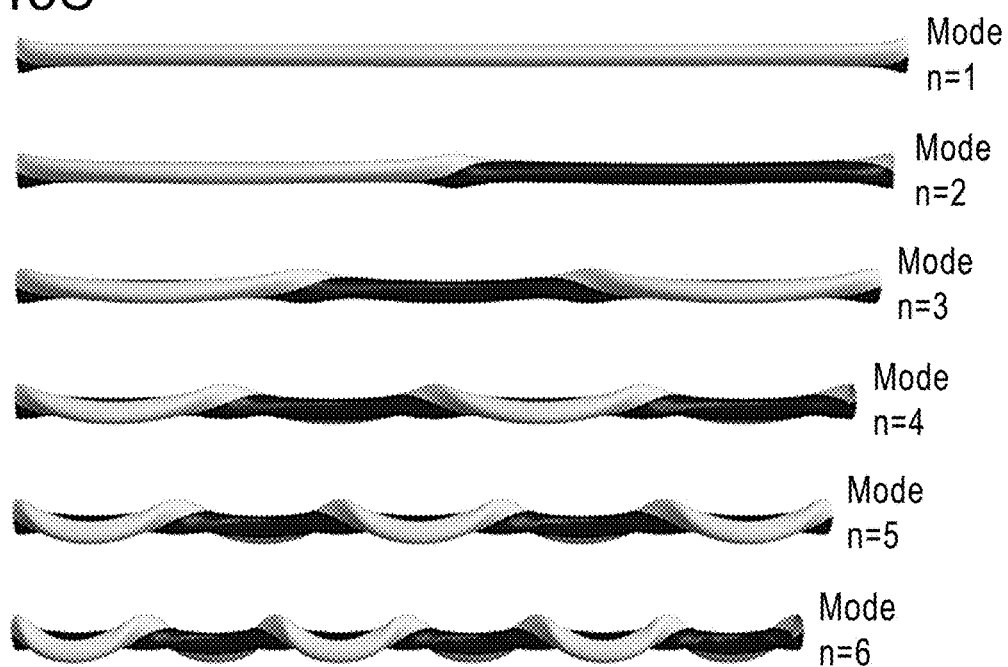
FIG. 15C illustrates modelled elastic rods bifurcating in a number of different modes.

In some cases, the second fiber can exhibit the formation of unstable bifurcations upon release during the cold draw process, which do not affect the thermal actuation behavior of these fibers. Such unstable bifurcations are also found in cucumber tendrils and were termed "perversions" by Charles Darwin. In some cases, the cold draw process can include releasing, after extending, both ends of the second fiber simultaneously to prevent the formation of such perversions. The stochastic formation of these bifurcations is predicted by applying the Kirchhoff theory for thin rods to the fibers with elliptical cross sections (see Example below, FIGS. 13-15).

Figure 2A:
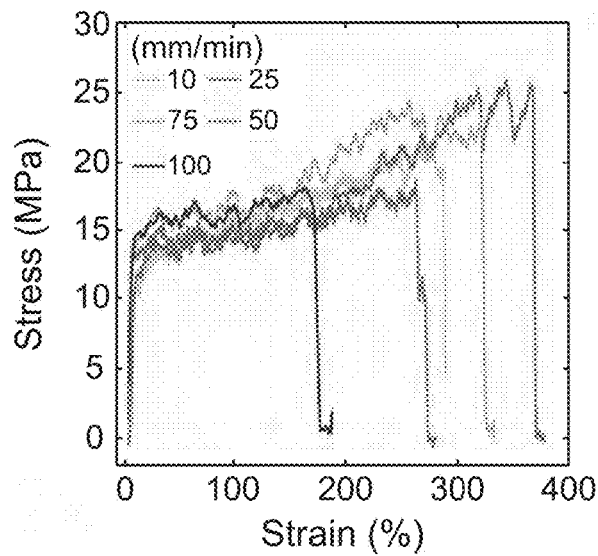
FIG. 2A shows stress-strain curves recorded at different extension rates for precursor fibers (without PMMA cladding) with a cross-sectional area of 300 µm×470 µm.

FIGS. 2A-2F illustrate, using an example COCe/PE second fiber, the effects of cold drawing parameters on the mechanical properties of this fiber, and an artificial muscle fabricated using this fiber. Fibers composed of only PE or only COCe alone exhibit stress-strain characteristics of a tough plastic and an elastomer, respectively, but a COCe/PE second fiber exhibit intermediate behavior (FIG. 2A). Increasing the deformation rate from 10 mm/min to 50 mm/min during the cold drawing of the second fiber allowed for greater built-in strain within the artificial muscle. Further increasing the deformation rate, however, reduced the amount of achievable strain (FIG. 2A). This was consistent with an increase in the yield strength and the elastic modulus in thermoplastic materials with increasing deformation rate.

Figure 2B:
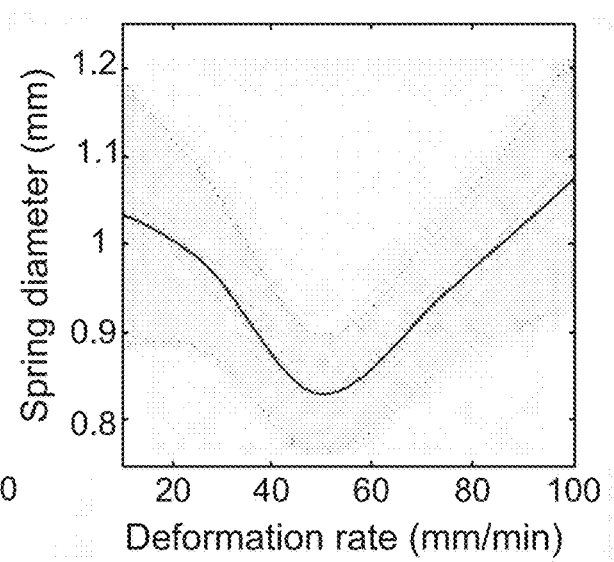
FIG. 2B shows change in the spring diameter with respect to the deformation rate.
Figure 2C:
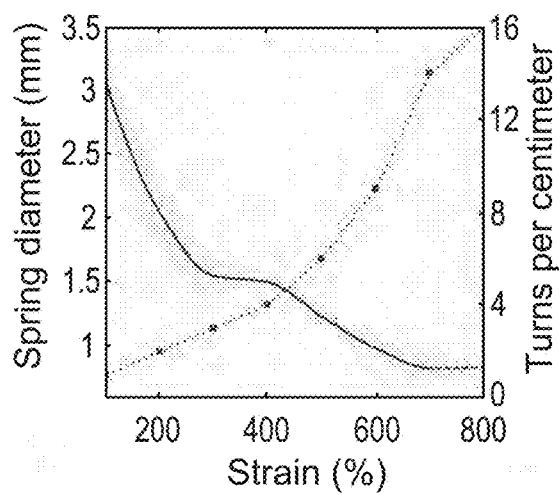
FIG. 2C is a plot of spring diameter and number of coils versus applied pre-strain. Error bars and shaded areas represent average and standard deviation, respectively. The number of samples is n=5.
Figure 2D:
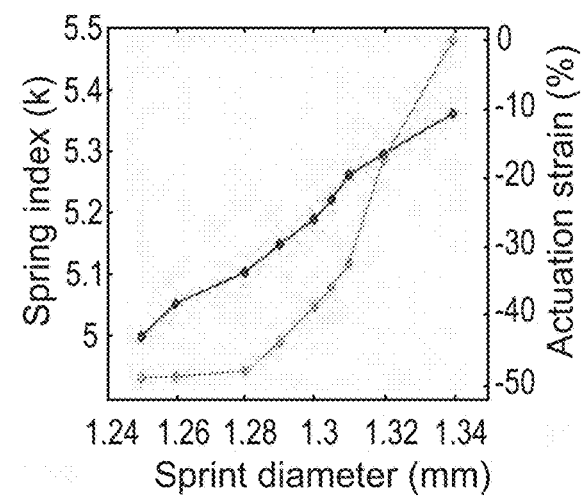
FIG. 2D shows change in the spring index with respect to spring diameter and actuation strain.
Figure 2E:
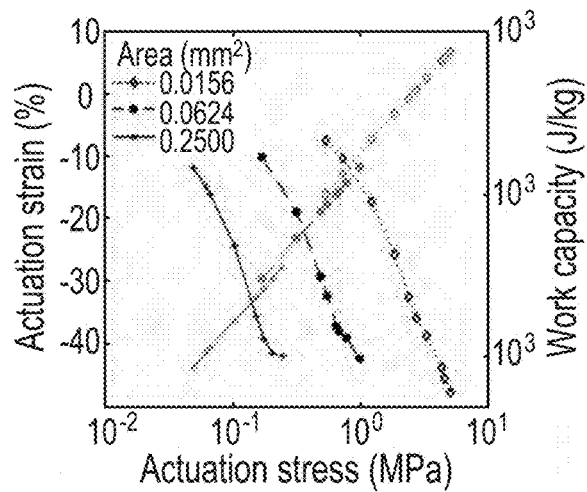
FIG. 2E shows change in the actuation stress-strain (grey) and energy/work density (green). Attributes of the fibers are k=6, 6 turns/cm (continuous line); k=5, 10 turns/cm (dashed line); k=5.5, 12 turns/cm (dot line).
Figure 2F:
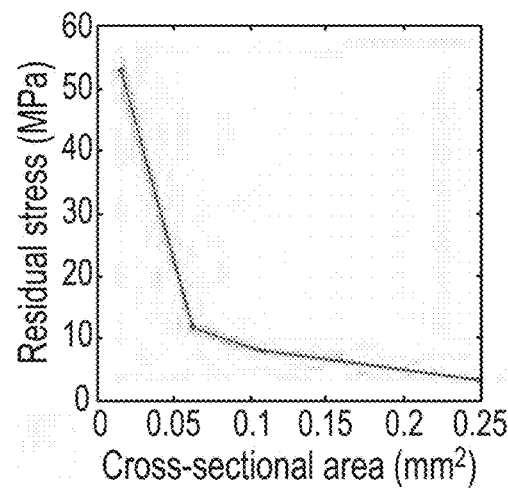
FIG. 2F shows change in the residual stress with respect to the cross-sectional area.

For a given fiber, the spring diameter and the spring index of the actuators formed by cold drawing were controlled by the deformation rate and the maximum applied strain (FIGS. 2B-2D). Consistent with the maximum allowable strain observed at 50 mm/min for second fibers with 300 μm×470 μm cross-sectional area during the cold draw, the fiber diameters reached their minimum at this deformation rate (FIG. 2B). At a fixed deformation rate, increasing the strain applied to the fiber during cold drawing resulted in smaller diameters and a greater number of turns per centimeter (FIG. 2C). Spring index (k), which is a measure based on outer diameter and fiber diameter of the fiber, increased with the spring diameter (of the spring-like structure of the fiber, formed after cold drawing) and with the strain (FIG. 2D) applied during the cold draw, resulting in higher work capacity (FIG. 2E). An increase in the strain applied during the cold draw decreased the spring diameter of the fiber, and thus the spring index. Decreasing cross-sectional dimensions of the first-step fibers, or the second step fiber, or both, yielded an increase in residual stress following the cold drawing process (FIG. 2F).

Figure 2G:
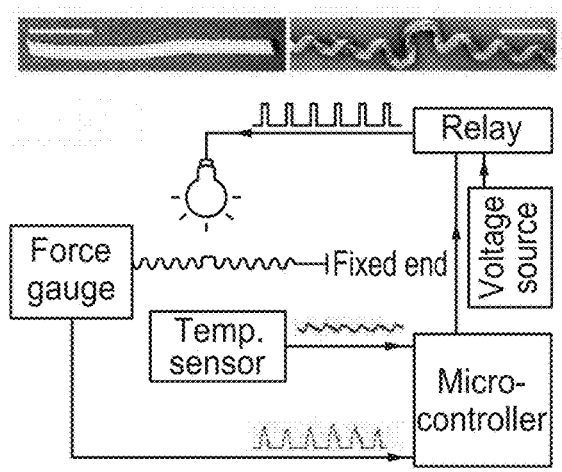
FIG. 2G illustrates the setup used for the force measurement of the fibers with 300 µm×470 µm cross-section (scale bar is 5 mm). For the fibers with a 8 µm×12.5 µm cross-section (scale bar is 200 µm), a similar setup was used. The optical heat source was replaced with a micro-Peltier heater.
Figure 16:
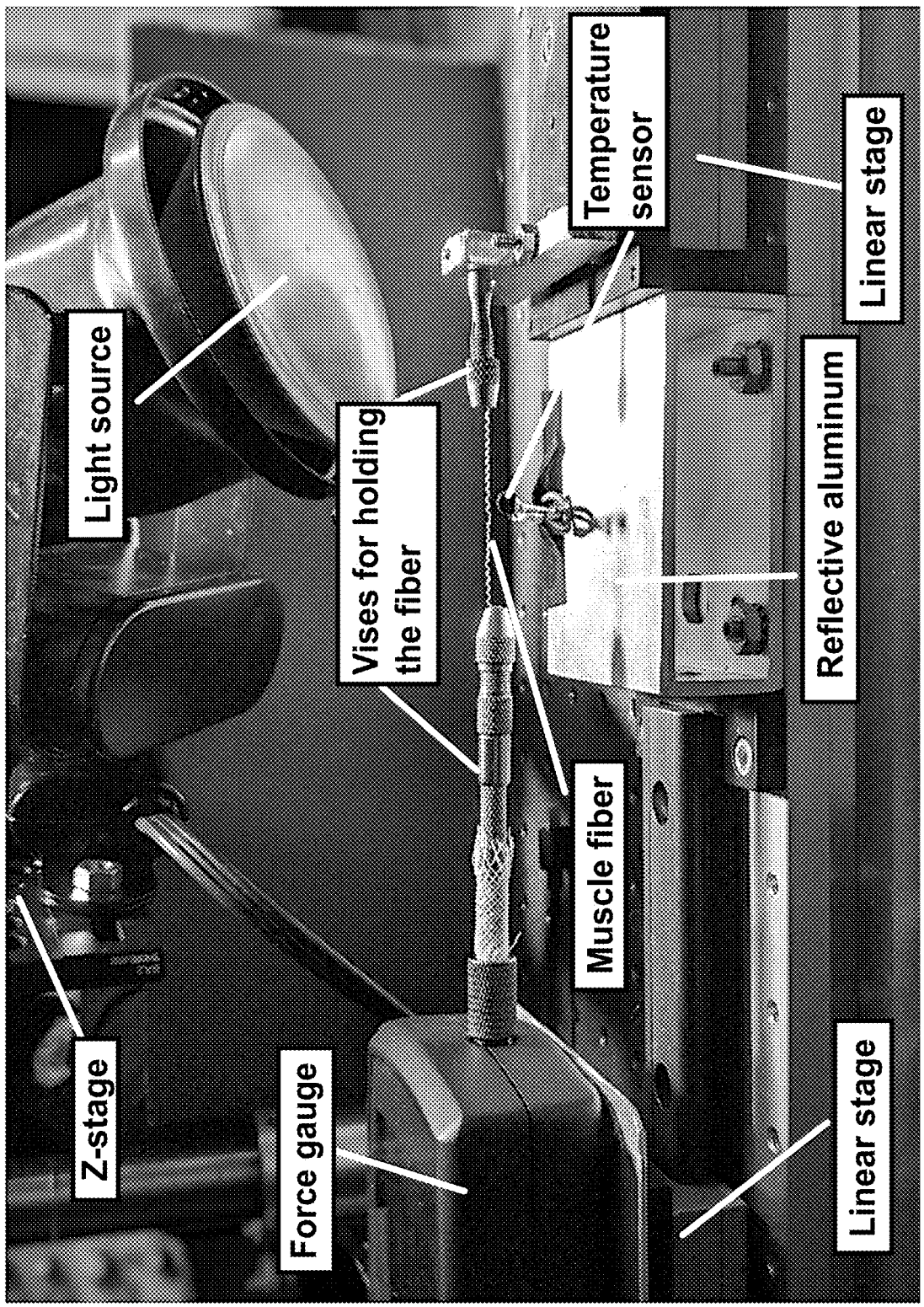
FIG. 16 shows a force measurement setup for artificial muscle. Custom-made force measurement setup consisting of two linear stages, photo-thermal heat source, temperature sensor, and vises for holding the muscle fiber.
Figure 17C:
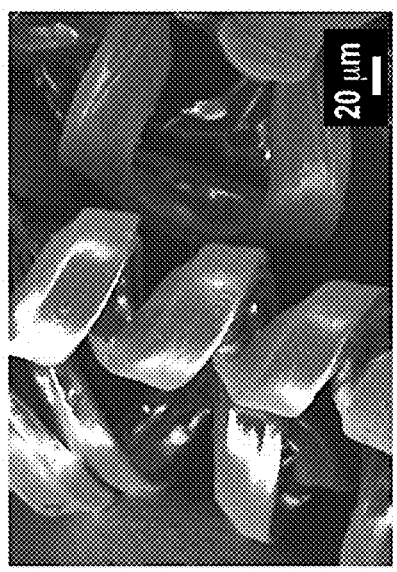
FIG. 17C is another image of a bundle of second fibers after mechanical extraction from their PMMA cladding, and illustrating how they acquire a helical form upon extraction.
Figure 17F:
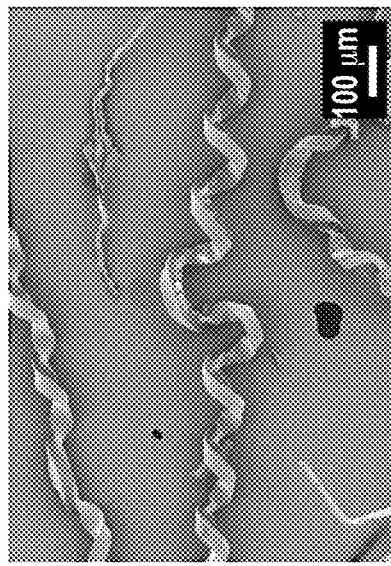
FIG. 17F is an image also showing perversion formation observed in smaller muscle fibers.
Figure 17B:
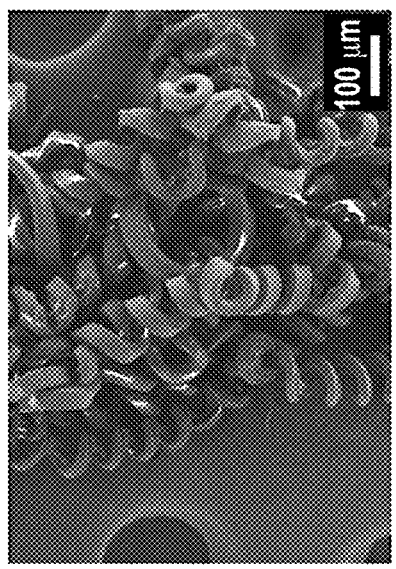
FIG. 17B is another image of a bundle of second fibers after mechanical extraction from their PMMA cladding, and illustrating how they acquire a helical form upon extraction.
Figure 17E:
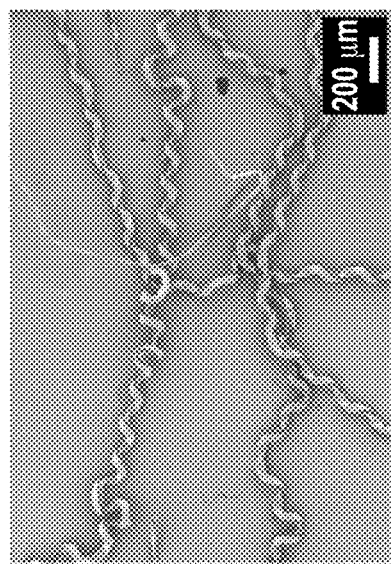
FIG. 17E is an image of perversion formation observed in smaller muscle fibers.
Figure 17A:
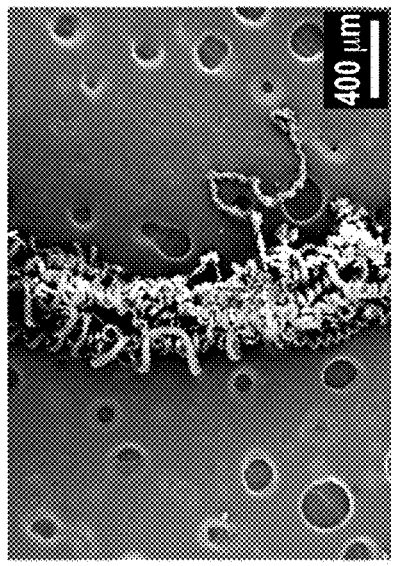
FIG. 17A is an image of a bundle of second fibers after mechanical extraction from their PMMA cladding, and illustrating how they acquire a helical form upon extraction.
Figure 17D:
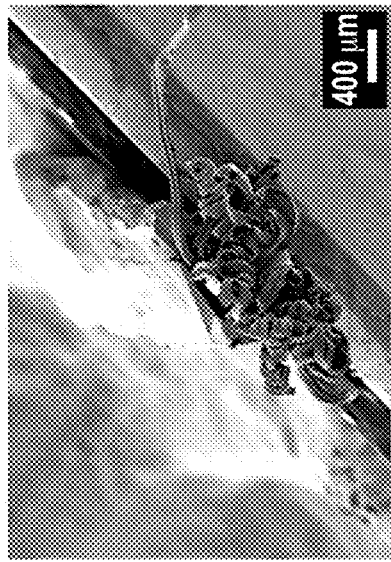
FIG. 17D is a broken cross-section image of a second step fiber. PMMA cladding was etched for 30 minutes using dichloromethane before extraction.

The force generated by the cold-drawn (maximum strain of 700%, 50 mm/min deformation rate) fiber and/or an artificial muscle based on the fiber, with cross-sectional areas of 300 μm×470 μm, can be characterized by connecting the fiber to a force gauge within a setup as illustrated in FIG. 2G (also see FIG. 16). A modulated broadband light supplies thermal stimuli, and a thermistor placed near the fiber muscles monitors the change in the temperature concurrent with the generated force measurements.

Figure 2H:
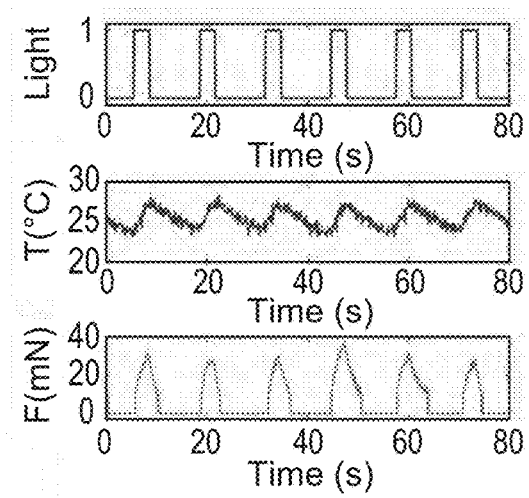
FIG. 2H shows temperature and force responses to photothermal pulses collected for a fiber with 300 µm×470 µm cross-section (k=5, 8 turns/cm).
Figure 2I:
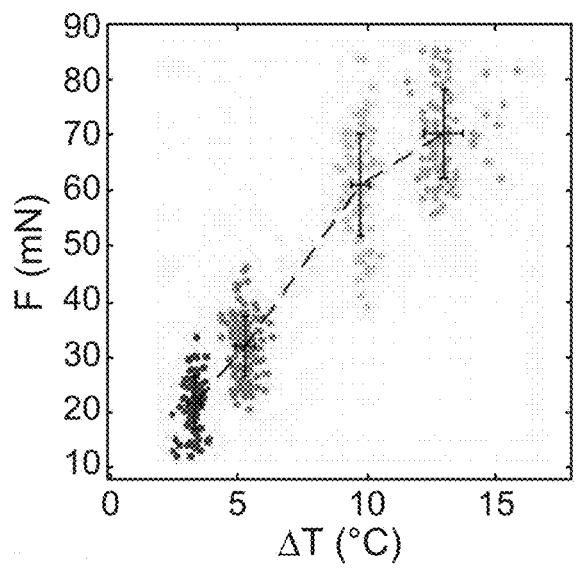
FIG. 2I is a plot of generated force vs. the temperature difference (number of cycles 300) for fibers with 200 µm×312 µm cross-section (k=5, 10 turns/m).
Figure 2J:
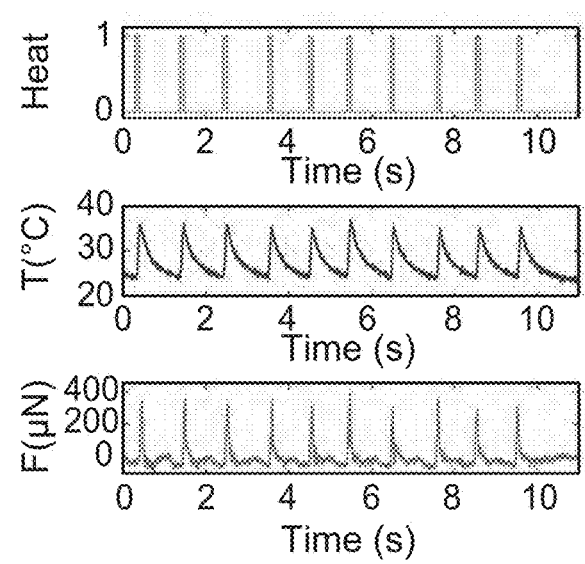
FIG. 2J shows temperature and force responses to thermal pulses for a fiber with an 8 µm×12.5 µm cross-section (k=4.6, 60 turns/cm).
Figure 2K:
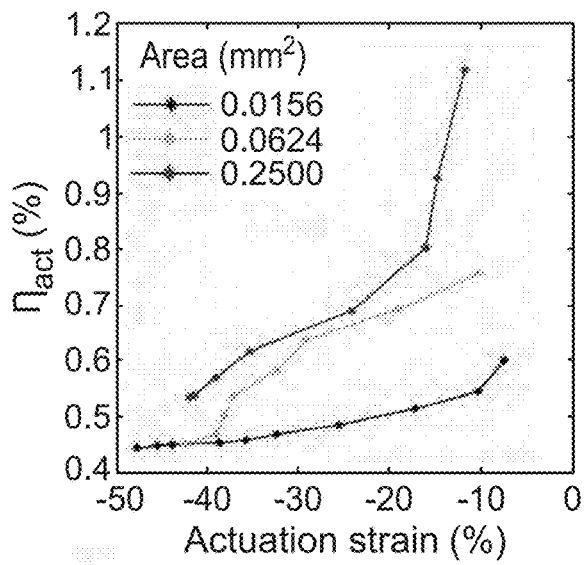
FIG. 2K shows changes in the efficiency with respect to actuation strain (blue line k=6, 6 turns/cm; green line k=5, 10 turns/cm; grey line k=5.5, 12 turns/cm).

Here, three-second illumination pulses separated by 10 second rest periods induced temperature gradients of 3.45±0.43° C./s (n=6 cycles), causing a force of 36.23±5.42 mN in 5 cm long fibers (FIG. 2H). An actuation rate of 13.25±1.66 N/s for a temperature increase rate of 1.11±0.12° C./s and a power-to-mass ratio of 75 Wkg surpasses the average human muscle (50 W/kg). Increasing the exposure times to the light source leads to a proportionate increase in both heating of the fiber and force generated by the fiber (FIG. 2I). No decline in performance is observed across multiple actuation cycles at different temperatures (FIG. 2I). Artificial muscles produced from fibers with cross-sectional areas of 8×12.5 μm$^2$ fabricated via the two-step thermal drawing can be similarly evaluated for their actuator performance (FIGS. 2G, 2J, see also FIGS. 16, 17A-17F). A micro-Peltier used to apply a thermal stimulus and a thermistor cans placed near the fiber muscles to monitor the change in the temperature concurrent with the generated force measurement (FIG. S13). A temperature gradient of 11.09±0.55° C./s (n=10 cycles) produces a force of 371±40.7 μN in 5 mm fibers. The actuation rate of the fiber is 6.33±0.72 N/s for a temperature increase rate of 130.3±16.9° C./s and the power-to-mass ratio was calculated as 90 Wkg$^{-1}$. The power efficiency of the fiber is found to increase with actuation strain and is higher for fibers with larger cross-sectional areas (FIG. 2K). Example performance attributes of the fiber are detailed in the Example below, and summarized in Table 3.

Figure 2L:
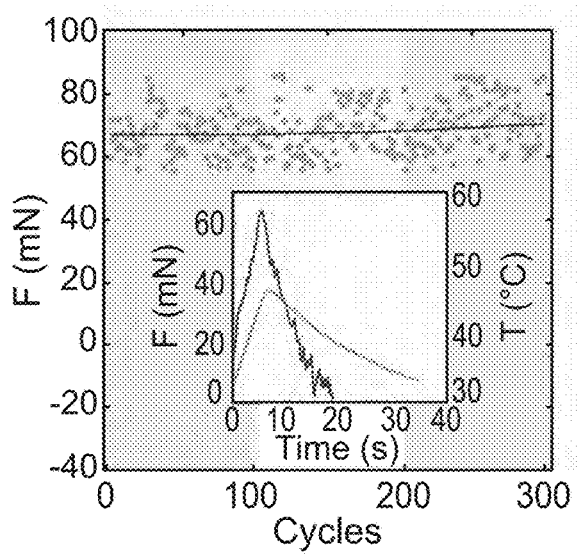
FIG. 2L shows force measured across 300 thermal actuation cycles applied over 3 consecutive days for a fiber with 200 µm×312 µm cross section (k=5, 10 turns/cm). Inset: A single actuation cycle.

To evaluate the long term performance of the fiber, the fiber (5 cm long, cross-sectional area 300 μm×470 μm) is subjected to 300 cycles of thermal actuation over 3 consecutive days ($\Delta T=13°$ C. for 6 s, followed by 30 s rest, FIG. 2L), and no decline in performance is observed.

Figure 3A:
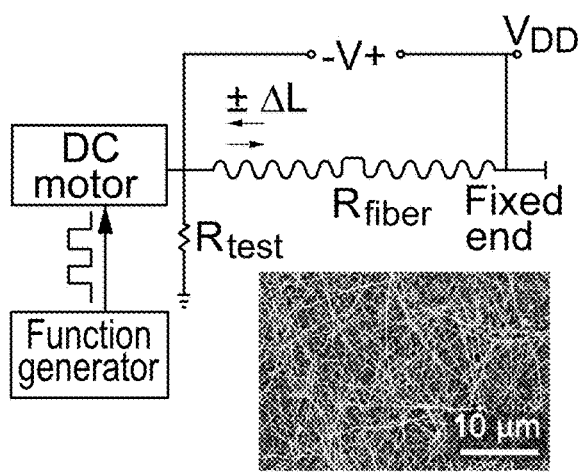
FIG. 3A is a schematic illustration of the setup for the resistance measurements for fibers in fiber-based artificial muscle with 300 µm×470 µm cross-sectional area (k=5, 8 turns/cm). Inset: A SEM image of silver nanowire mesh on the surface of a 300 µm×470 µm fiber-based muscle.
Figure 3B:
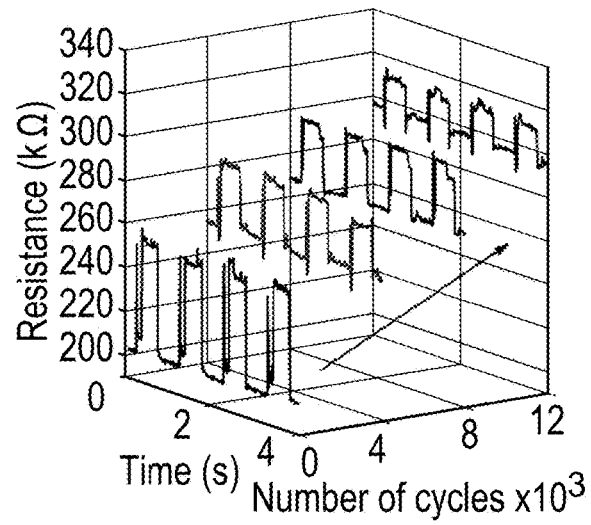
FIG. 3B illustrates resistance waveforms collected at different numbers of extension and release cycles for a fiber-based artificial muscle.
Figure 3C:
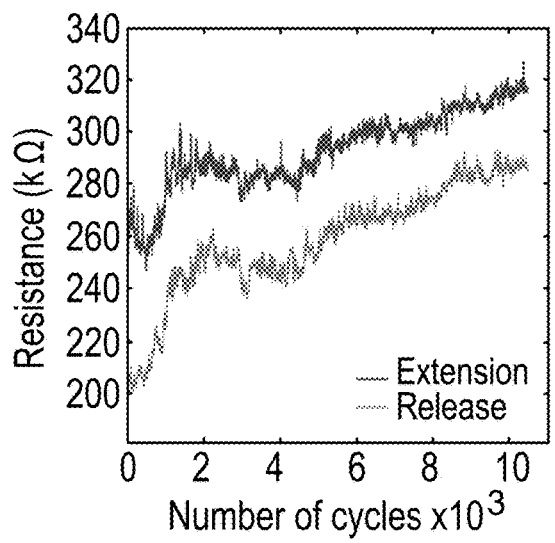
FIG. 3C illustrates the change in the extended and released resistance for 12000 cycles for a fiber-based artificial muscle.
Figure 3D:
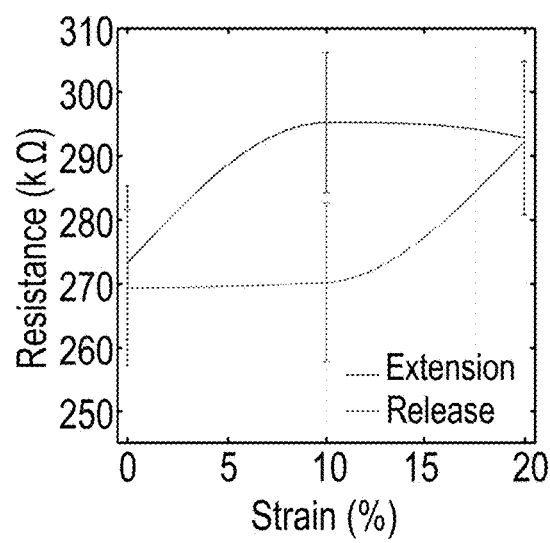
FIG. 3D shows a hysteresis curve showing the resistance vs. the applied strain for a single cycle of deformation for a fiber-based artificial muscle. The lines represent average and error bars represent the standard deviation.

To monitor fiber contraction and elongation, second fibers generated as described herein were outfitted with conductive meshes of silver nanowires (AgNW, diameter=70 nm and length=50 μm). These meshes can be deposited directly onto the surfaces of the fiber muscles following cold drawing, which is followed by the deposition of a protective stretchable layer of polydimethylsiloxane (PDMS) elastomer. Since percolation within the AgNW mesh changes with the contraction or elongation of the underlying substrates, AgNW coated fibers act as piezoresistive sensors of deformation in response to stimuli. To evaluate this sensing ability, one end of the fiber can be connected to a direct current (DC) motor, and the resistance change can be recorded by a voltage divider (FIG. 3A). A fractional resistance change of 0.47% was repeatable across 12,000 cycles of 20% elongation (FIGS. 3B-3D). While a slow increase in baseline resistance is observable (FIGS. 3B, 3C), the relative change between extension and release cycles remains stable (FIG. 3D).

Figure 4A:
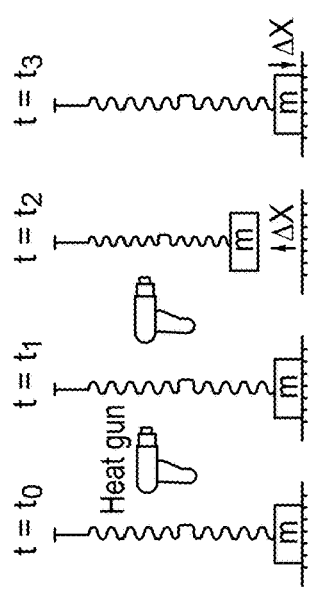
FIG. 4A is a schematic illustration of vertical lift experiment, where t is time, m is mass, and Δx is displacement, using a thermally actuated fiber-based artificial muscle.
Figure 4B:
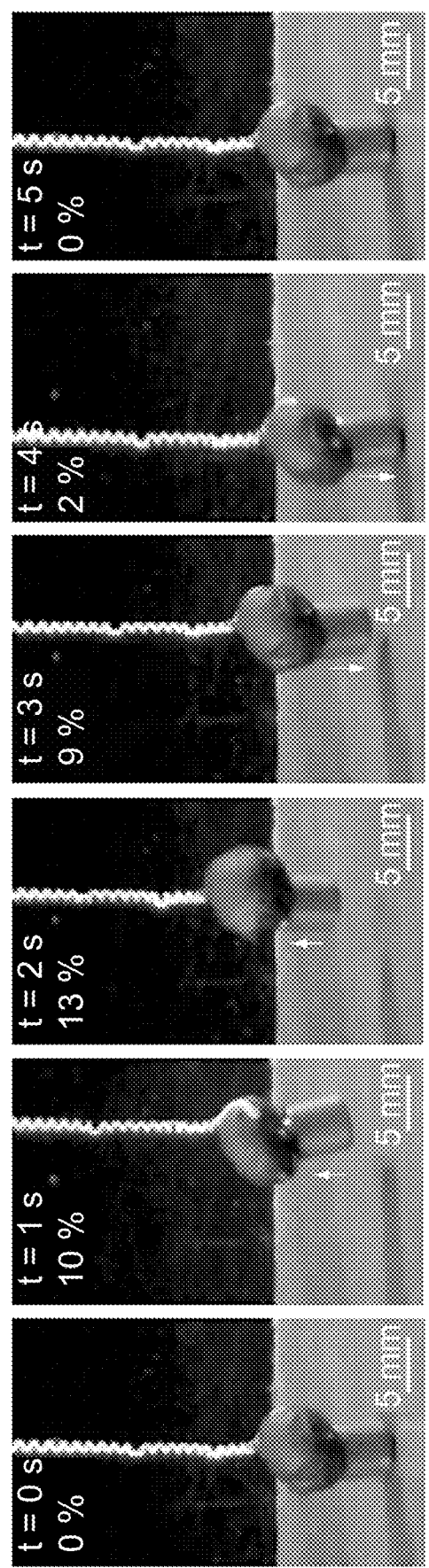
FIG. 4B is a photographic time series collected during the displacement experiment shown in FIG. 4A. The heat was applied to the fiber-based artificial muscle in 2-second pulses separated by 6-second rest epochs. The load mass is 1 gram.
Figure 4C:
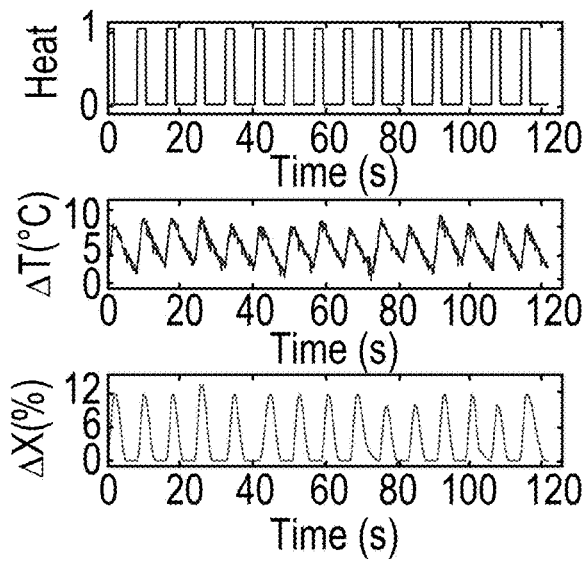
FIG. 4C shows waveforms for the heat pulses (top), the corresponding changes in the temperature at the fiber surface (middle), and the displacements of the 1-gram load in the experiment of FIG. 4A.
Figure 4D:
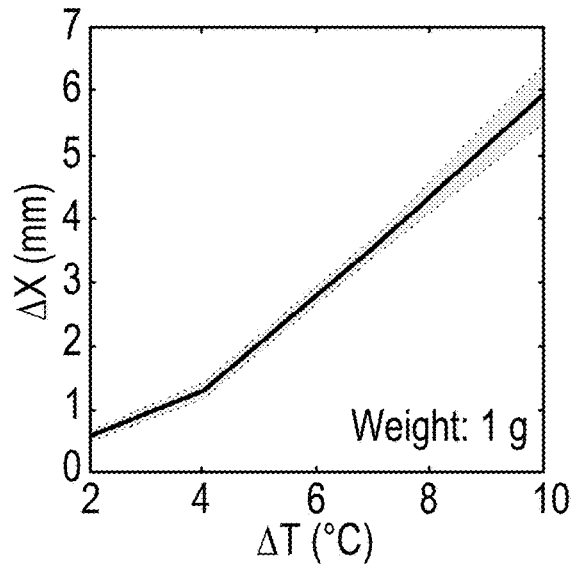
FIG. 4D shows the vertical displacement Δx of a 1-gram load in response to temperature increase ΔT.
Figure 4E:
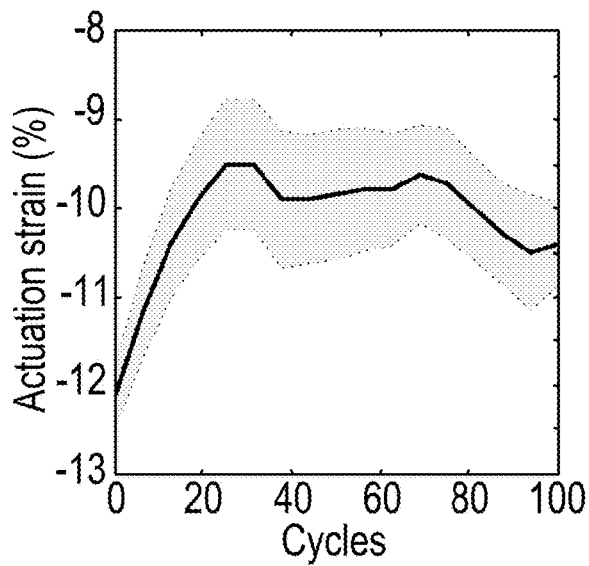
FIG. 4E shows strain measurement across 100 cycles of thermal actuation of the fiber-based artificial muscle.
Figure 4F:
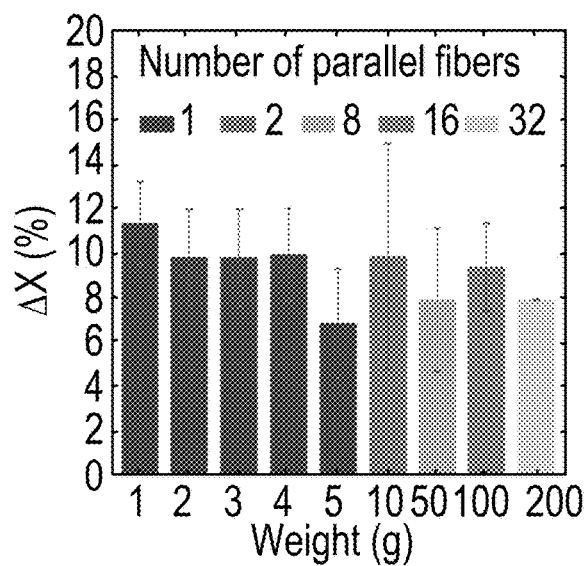
FIG. 4F shows the maximum displacement for fiber bundles loaded with weights of 1, 2, 3, 4, 5, 10, 50, 100, and 200 grams.

A single 5 cm long fiber with a cross-sectional area of 300 μm×470 μm is able to lift a 1 g weight by 5.12±0.76 mm (12% strain) in response to a thermal stimulus of $\Delta T=10°$ C. (from room temperature) delivered by a heat gun (FIGS. 4A, 4B). The spring index k=5 and the number of turns per cm of the fiber is 8. This behavior is reversible and repeatable across multiple cycles of 2 second heat pulses separated by 6 second rest periods, during which the fiber muscle cools down to room temperature (FIG. 4C). The vertical displacement of the weight was linearly correlated with the thermal gradient (FIG. 4D). Permanent deformation can be observed for temperature gradients A ° C. consistent with the thermomechanical properties of PE and COCe. Repeated application of 100 cycles of thermal actuation ($\Delta T=8.8\pm0.6°$ C.) delivers reproducible actuation strains (10.1±1.5%, FIG. 4E). While an additive boost in strength is afforded by bundling multiple fibers in an oblique fashion, no observable change in stretchability was observed (FIGS. 4F, 18A-18C).

Figure 4I:
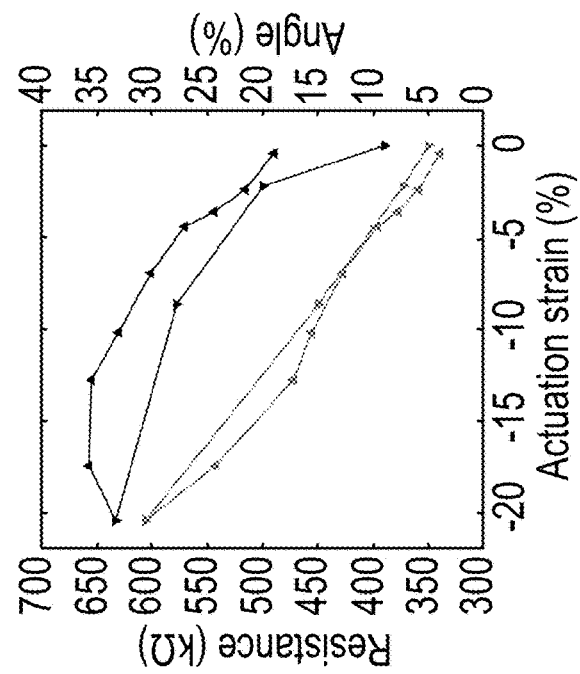
FIG. 4I is a plot of the change in the fiber length, a piezoresistive strain feedback signal, and the angle of the arm for the experiment in FIG. 4H.
Figure 4G:
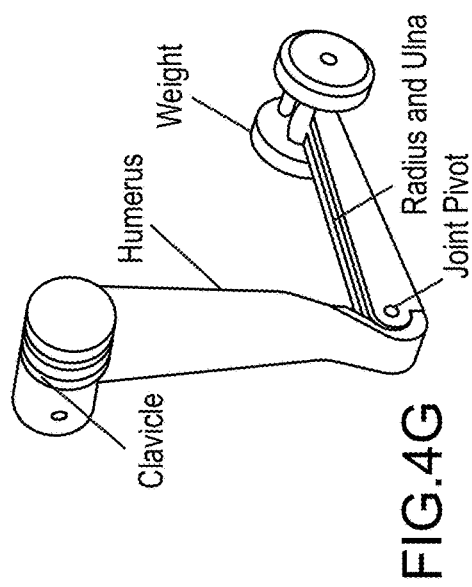
FIG. 4G shows a printed model of a weight-lifting artificial limb, inspired by a human arm.
Figure 4H:
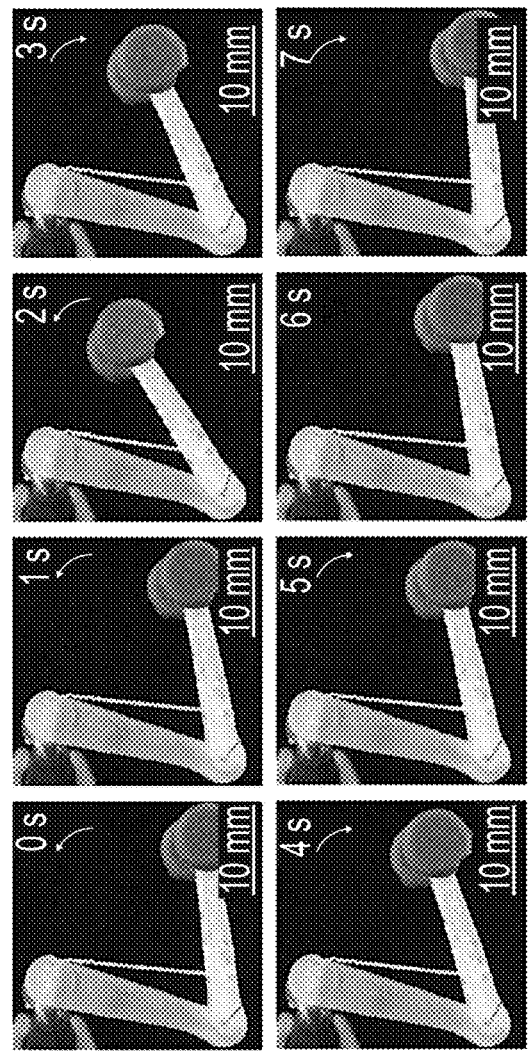
FIG. 4H is a photographic time series of the artificial limb lifting a 1 g load. The heat was applied using a heat gun for 2 s and followed by 5 s rest epochs.

To further illustrate the potential application of the cold drawn fiber as a model of biological muscle, a weight-lifting artificial limb inspired by a human arm was designed and printed (FIG. 4G). One end of the fiber (300 μm×470 μm cross section) was then affixed to the radius and ulna of the model forearm, while the other end was affixed to the clavicle. As found in the human arm, the joint between the humerus and the forearm was aligned with the clavicular muscle connection slot to maximize the displacement corresponding to a given bicep contraction. The artificial bicep was actuated by 2 s heat pulses ($\Delta T=10°$ C.) delivered by a heat gun, and relaxed upon cooling to room temperature (FIG. 4H). The change in an angle between the forearm and humerus during operation correlates linearly with the fiber muscle contraction and extension (FIG. 4I). A miniature arm is used to lift a 1 g dumbbell, and the platform is scalable to a larger limb with greater weightlifting performance of 2 g afforded by 2 parallel fibers.

The methods presented herein can be scaled to produce fibers, and fiber-based actuators/muscles with lateral dimensions ranging from millimeters to microns and arbitrary lengths. Hundreds of meters of fibers (e.g., second fibers) composed of glassy polymer (e.g., PE) and elastomer (e.g., COCe) layers can be produced by thermal drawing. When subjected to cold drawing (e.g., at strains in excess of 700%), upon release the mismatch in mechanical properties of the glassy polymer and the elastomer leads to self-assembly of these fibers into spring-like form with the spring index and residual stress determined by the fiber cross-sectional dimensions, the applied strain, and the deformation rate. The mismatch in the thermo-mechanical properties between the glassy polymer and the elastomer enables reversible and repeatable thermal actuation of the resulting fiber and fiber-based artificial muscles by modest thermal stimuli ($\Delta T<20°$ C.) at temperatures between 20-50° C. Deposition of stretchable metal nanowire meshes onto fiber surfaces, imparted the fiber and the fiber-based muscles with piezoresistive properties allowing for real-time strain measurements during actuation. Being based on soft materials, these lightweight and scalable may lend themselves to applications in biomedicine, as well as in robotics and prosthetic limb technologies.

Accordingly, FIG. 5A illustrates a method 500A of making a fiber, such as the second fiber described herein with respect to FIGS. 1-4. The method 500A includes, at step 510, drawing a fiber from a set of substances (e.g., see FIG. 1A). The set of substances can include an elastomer having a first thermal expansion coefficient. The elastomer can be a cyclic olefin copolymer elastomer. The set of substances can also include a glassy polymer having a second thermal expansion coefficient that is higher than the first thermal expansion coefficient. The glassy polymer can be polyethylene. The set of substances can include a cladding material, such as, for example, poly(methyl methacrylate) (PMMA). The drawing can include applying heat to the fiber, where the elastomer and the glassy polymer have similar viscosities at the drawing temperature associated with the drawing.

The fiber can be a second fiber as described herein, and the method 500 can further include drawing a first fiber from the set of substances, followed by drawing the second fiber from the first fiber. The second fiber can have a lower average cross-sectional area than the first fiber overall, since cross-sectional area can vary along the length of a fiber due to manufacturing consideration. The average cross-sectional area of the second fiber can be from about 1 µm² to about 250 µm².

The method 500A can also include creating a preform from the set of substances by encapsulating a slab of the elastomer and a slab of the glassy polymer collectively in a cladding material. The method 500A can then include drawing the first fiber from the preform. The method 500 can also include annealing the preform prior to drawing the first fiber The method 500A can also include drawing the first fiber as a set of first fibers, such that drawing the second fiber includes drawing a set of second fibers, with each second fiber corresponding to one of the first fibers. The method 500A can also include encapsulating all the first fibers (i.e., collectively) in another cladding material before drawing the set of second fibers. Each first fiber can have having an average cross-sectional area from about 0.0025 mm² to about 25 mm², and a length from about 1 m to about 10,000 m. The set of first fibers can include from 2 first fibers to 400 first fibers.

The method 500A can further include, at step 520, extending and then releasing, under ambient temperature conditions, the fiber to increase elastic responsiveness of the fiber to thermal actuation. Step 520 can further include inducing a strain from about 50% to about 1300% in the fiber. Step 520 can also include deforming the fiber at a deformation rate from about 10 mm/min to about 50 mm/min. Step 520 can also include simultaneously releasing both ends of the fiber to avoid formation of perversions.

The method 500A can further include removing (before step 520) any cladding material (e.g., the first and second cladding materials from the set of second fibers noted above).

Aspects disclosed herein can encompass a fiber as formed by the method 500A. Aspects disclosed herein can also encompass an artificial limb device including a fiber formed by the method 500A.

Figure 5B:
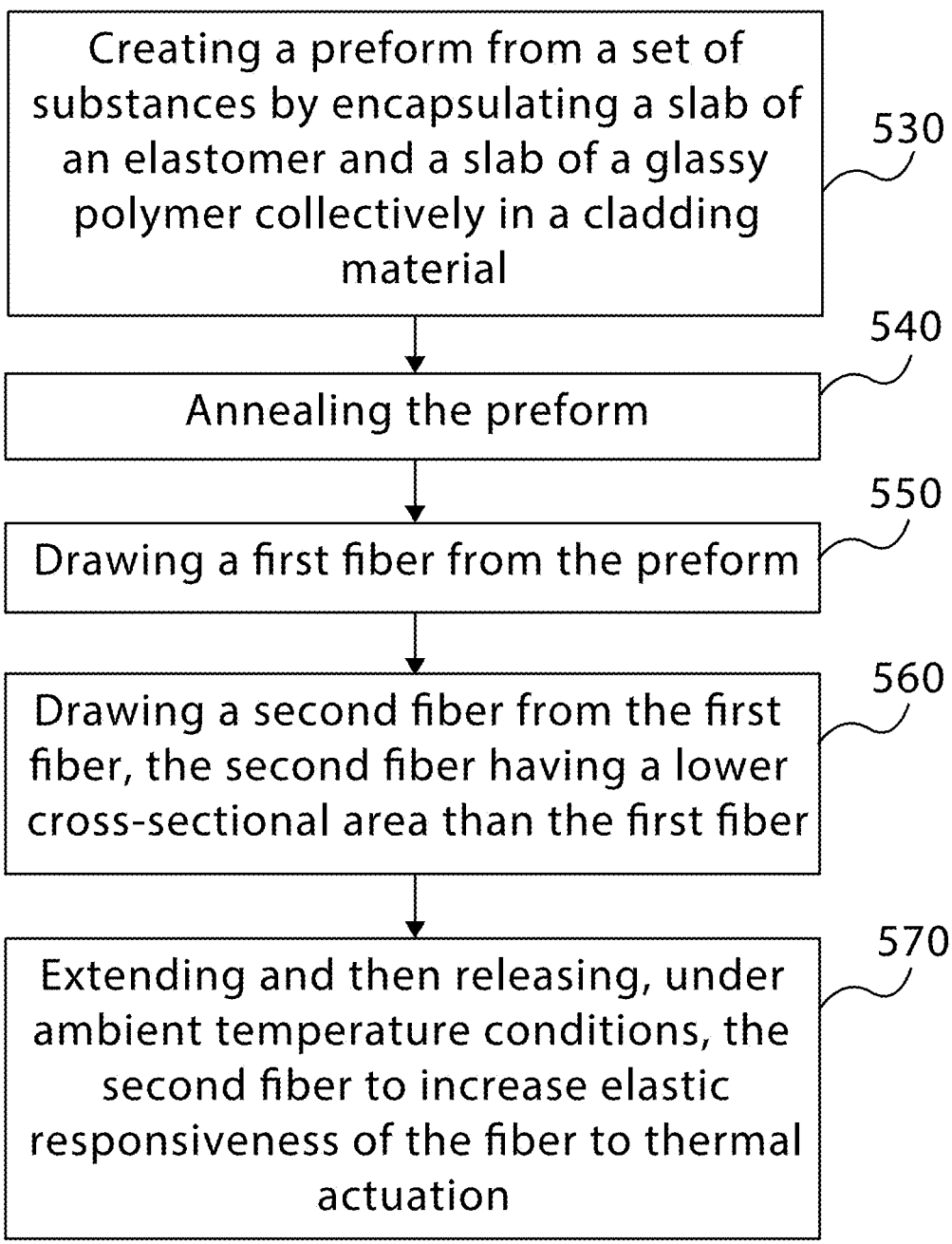
FIG. 5B is flowchart illustrating another method of making a thermal-responsive fiber.

FIG. 5B illustrates a method 500B of making a fiber, such as the second fiber described herein with respect to FIGS. 1-4. The method 500B includes, at step 530, creating a preform from a set of substances by encapsulating a slab of an elastomer and a slab of a glassy polymer collectively in a cladding material (e.g., see FIG. 1A). The elastomer can be a cyclic olefin copolymer elastomer. The glassy polymer can be polyethylene. The glassy polymer can have a thermal expansion coefficient that is higher than the thermal expansion coefficient of the elastomer. The cladding material can be poly(methyl methacrylate) (PMMA). The method 500B can further include, at step 540, annealing the preform.

The method 500B can further include drawing first fiber from the preform at step 550. This can include applying heat to the fiber, where the elastomer and the glassy polymer have similar viscosities at the drawing temperature.

The method can further include drawing a second fiber from the first fiber at step 560. The second fiber can have a lower cross-sectional area than the first fiber. The cross-sectional area of the second fiber can be from about 1 µm² to about 250 µm².

The method 500B can also include drawing the first fiber as a set of first fibers, such that drawing the second fiber includes drawing a set of second fibers, with each second fiber corresponding to one of the first fibers. The method 500B can also include encapsulating all the first fibers (i.e., collectively) in another cladding material before drawing the set of second fibers. The set of first fibers can include from 2 first fibers to 400 first fibers.

The method 500B can further include, at step 570, extending and then releasing, under ambient temperature conditions, the second fiber to increase elastic responsiveness of the second fiber to thermal actuation. This can induce a strain from about 50% to about 1300% in the second fiber. Step 570 can be carried out to induce a deformation rate from about 10 mm/min to about 50 mm/min in the second fiber. Both ends of the second fiber can be simultaneously released to avoid formation of perversions.

Aspects disclosed herein can encompass a fiber as formed by the method 500B. Aspects disclosed herein can also encompass an artificial limb device including a fiber formed by the method 500B.

Figure 6:
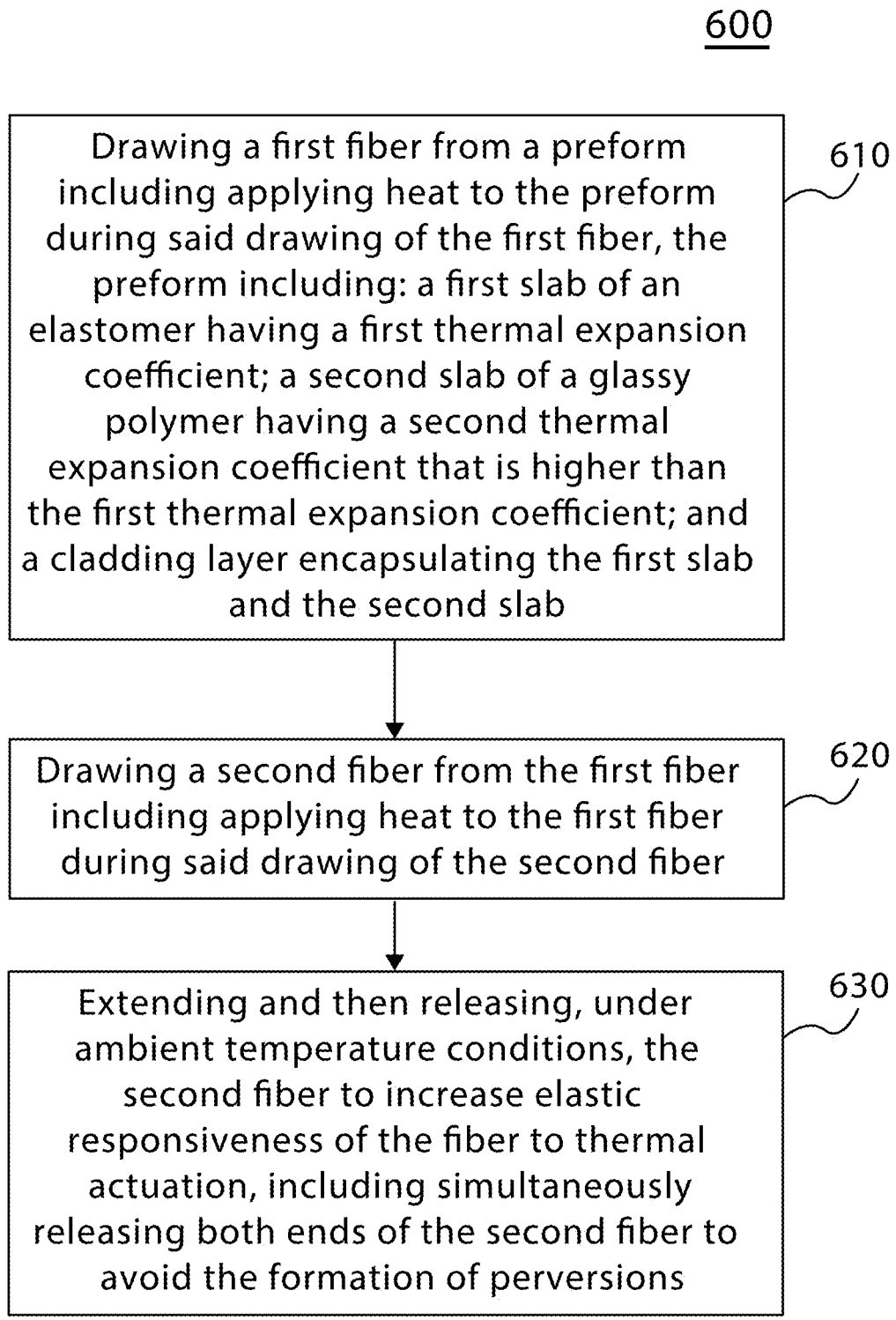
FIG. 6 is a flowchart illustrating yet another method of making a thermal-responsive fiber.

FIG. 6 illustrates another method 600 of making a fiber, such as the second fiber described herein with respect to FIGS. 1-4. The method 600 includes, at step 610, drawing a first fiber from a preform that includes applying heat to the preform during the drawing of the first fiber. The preform includes a first slab of an elastomer having a first thermal expansion coefficient, and a second slab of a glassy polymer having a second thermal expansion coefficient that is higher than the first thermal expansion coefficient. The method 600 also includes, at step 620, drawing a second fiber from the first fiber including applying heat to the first fiber during the drawing of the second fiber. The method 600 further includes, at step 630, extending and then releasing, under ambient temperature conditions, the second fiber to increase elastic responsiveness of the fiber to thermal actuation. Step 630 can further include simultaneously releasing both ends of the second fiber to avoid the formation of perversions.

Example

A high-throughput iterative fiber drawing technique is employed to create strain programmable artificial muscles (also sometimes referred to as second fibers as described herein, as fiber-based muscles, as fiber-based actuators, and/or the like) with dimensions spanning three orders of magnitude. These fiber-based actuators are thermally and optically controllable, can lift more than 650 times their own weight, and withstand strains of >1000%. Integration of conductive nanowire meshes within these fiber-based muscles offers piezoresistive strain feedback and demonstrates long-term resilience across >105 deformation cycles. The scalable dimensions of these fibers/fiber-based actuators and their strength and responsiveness surpassing those of the human muscle may extend their impact from engineering fields to biomedical applications.

Fiber design and finite element models—The artificial muscle was designed using a finite element model constructed in COMSOL Multiphysics. Geometrical parameters and material selection were optimized by solving solid mechanics and heat transfer in solids models in parallel. All materials were specified to be linear elastic materials with a bimorph interface as a non-slip boundary while the geometry was fixed from one end and all other boundaries were free. The whole system was specified to be a thermal insulating system with heat applied from the fixed end. The initial temperature was set to 293.14 K and the final temperature was set to 333.15 K.

Preform fabrication—COCe was purchased from TOPAS in pellet form and molded into a slab shape at 200° C. at $10^{-3}$ mmHg pressure in a vacuum for 2 days. High-density PE and PMMA were purchased from McMaster-Carr. The PE and COCe were milled and then hand-ground into 20×8×200 $mm^3$ blocks. PMMA plates were cut into 12.7×35×280 $mm^3$ slabs. Trenches with dimensions 8×25×200 $mm^3$ were machined in the centers of the two PMMA slabs. COCe and PE parts were sandwiched between the PMMA slabs. The resulting composite was consolidated in a hot press at 50 Barr at 125° C. for 4 hours. Prior to consolidation, the preform was held at 100° C. for 8 hours. The preform was cooled to 80° C. prior to the release of pressure.

To prepare a second-step preform, two PMMA plates were machined into 12.7 mm×35 mm×280 mm slabs. Trenches with cross-sectional dimensions 2 mm×4 mm were machined along the entire lengths of the two PMMA slabs, and the two parts were consolidated using the parameters described above. Fibers from the first drawing step were cut to a length exceeding that of the PMMA cladding by ~25 cm and stacked into the hollow core of the preform. The fibers were then sealed using a heat gun at both ends of the preform.

Figure 20:
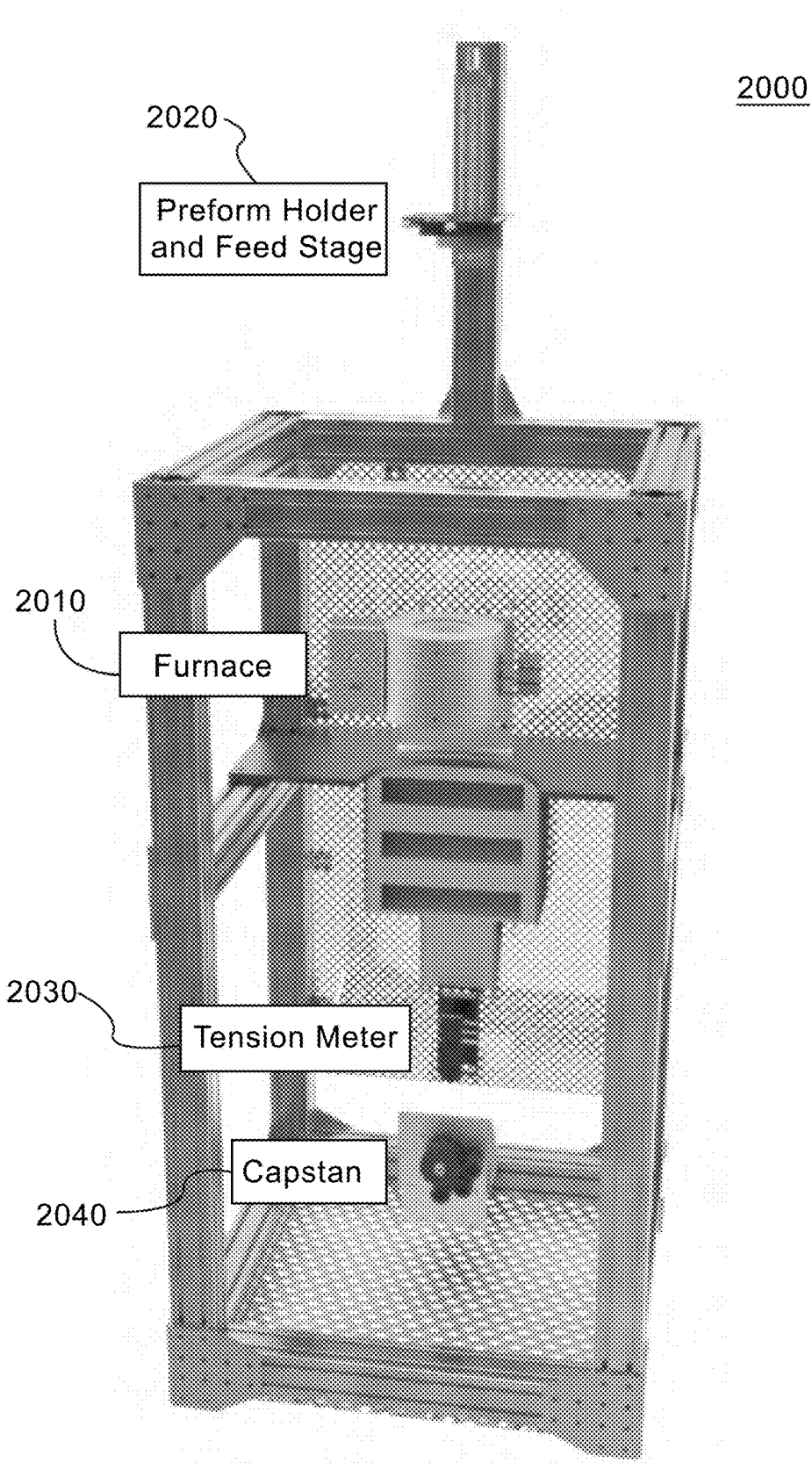
FIG. 20 is a picture of an example fiber tower.

Fiber drawing process—The fiber drawing was performed in a vertical drawing tower with 3 heating zones within a furnace, as illustrated by the furnace 2010 of the bench top fiber draw tower 2000 in FIG. 20. The top and bottom zones within the furnace 2010 were set to 150° C. and the middle zone, where the necking region (i.e., the region where the deformation of the polymer layers of the preform occurs) of the preform was situated, was set to 310° C. After the initiation of the flow, the temperature of the middle zone was tuned between 290-300° C. The feeding speed for the preform entering the furnace 2010 from the drawing tower from the preform holder/feed stage 2020 was set to 1 mm/min and the drawing speed was tuned between 2-3 m/min using the capstan 2040, resulting in the tension of 70-100 mN within the fiber during drawing as measured by the tension meter 2030.

Cladding removal process—PMMA claddings were stripped off for extracting bimorph fiber muscle structures. Brittle PMMA cladding was removed mechanically by hand or pliers for the first-step fibers. The second step fibers were extracted out of their claddings using mechanical and chemical processes. PMMA cladding can be selectively etched in Acetone or Dichloromethane by dip etching or dripping method.

Cold drawing process—Cold drawing process requires pulling of the fiber from both ends to extend and release. Cold drawing without deformation rate control can be performed manually using pliers. Cold drawing with a controlled deformation rate was conducted using Instron 5984 Tensile Tester.

Mechanical tests—Mechanical properties and coil formation mechanism of the bimorph fibers were investigated using an Instron 5984 Tensile Tester. 3 mm long fibers with cross-sectional areas of 300 μm×470 μm were prepared. Using a specimen holder, fibers were attached to the tensile tester and 1 mm margin from each end was used for attachment. Thus, only 1 mm long fiber sections were exposed to tensile stress. The number of samples was 5 for each experiment.

Morphological characterization—SEM micrographs were taken using JEOL 6610LV, ZEISS GeminiSEM FE-SEM and MIRA3 TESCAN. 2 nm thick of gold was sputtered on fibers before imaging. AgNWs 15 coated fibers were attached to the specimen holder using silver paste without gold coating. Fibers were embedded in Technovit 7100 resin and trimmed using Reichert/Leica UltraCut E ultramicrotome before cross-sectional imaging.

Quantification of actuation forces in fiber-based muscles—The force characterization of the fibers with cross-sectional areas of 300 μm×470 μm was conducted with a custom-made setup. The two ends of the fiber were attached to a platform with movable gates. One end of the fibers was connected to a force gauge (Nidec-Shimpo FG7000) and the other end was held fixed during the experiments. The thermal stimulus was delivered by a high-intensity light source (Sylvania Capsylite Par30 75 W 120V NSP). The light source was driven by a relay (KEYES 5V Relay Module) that controls the supplied voltage to generate photothermal pulses with different duty cycles.

The duty cycle was set using a microcontroller (Arduino UNO). A temperature probe (TMP36) was fixed immediately adjacent to the fiber to monitor the temperature change during actuation. The microcontroller was used as the readout for the temperature sensor and the force gauge.

During the experiments, pre-strain measured by a force gauge (>150 mN) was applied from one end of the fiber-based actuator. The light was turned on for 3 seconds for illumination and was followed by a 10 second rest period. The force and temperature data were recorded for further analysis.

The force characterization of the second-step micrometer-scale fibers with cross-sectional areas of 8 μm×12.5 μm was performed in a setup designed to measure smaller forces. The actuation load of microfibers was measured by a Hysitron PI-88 Picoindenter. One end of the coiled microfibers was fixed to a MEMS transducer and the other end was attached to an XYZ sample-positioning stage. A micro-Peltier heater (TE Technology Micro Modules) was placed ~1 mm from the microfibers, and a temperature sensor was in direct contact with the heater. The microfibers were preloaded with 500 μN tensile force. The tests were performed in a displacement-controlled mode, and the load change induced by temperature was measured while the displacement (the length of the sample) was controlled to maintain a fixed value.

Calculation of actuator attributes—the fiber length was measured at maximum contraction ($x_{min}$) and compared the length to the initial fiber length at rest ($x_{rest}$) to find the maximum actuation strain ($\varepsilon_{act}$).

$$\varepsilon_{act} = \frac{(x_{min} - x_{rest})}{x_{rest}} \times 100$$

Maximum actuation stress ($\sigma_{act}$) of the fibers was calculated by the ratio of maximum exerted force ($F_{max}$) and the cross-sectional area of the fiber ($A_{fiber}$).

$$\sigma_{act} = \frac{F_{max}}{A_{fiber}}$$

Spring indices of the fiber muscles were determined by the ratio of spring diameter to fiber thickness.

The efficiency of the actuators ($\eta_{act}$) was calculated by finding the ratio of the work output ($Q_{out}$) to the available input energy($Q_{in}$). $P_{bulb}$=30 mW input power from the light bulb was incident on the fiber and the work generated was measured from the actuation strain ($\Delta x$) where the fiber was free to move at both ends. By changing the duration of the light input, the work output for different temperatures and actuation strains was measured.

$$\eta_{act} = \frac{Q_{out}}{Q_{in}} \times 100 = \frac{\frac{1}{2}k(\Delta x)^2}{P_{bulb} * \text{time}} \times 100$$

Work capacity calculations were extracted from the same measurements as the efficiency measurements. The work output energy was divided by the weight of the fibers ($m_{fiber}$) with different cross-sections to calculate the work capacity. Maximum value at a specific strain was reported as the maximum work capacity.

$$\text{Work Capacity} = \frac{Q_{out}}{m_{fiber}}$$

Nanowire coating and resistance measurement—Following the release from the PMMA cladding, the fibers were pre-strained and then released to create coil structures. The surfaces of the resulting fiber-based actuators were treated with 100 W oxygen plasma for 1 minute. The fibers were dipped in silver nanowire solution (Novarials, diameter=70 nm, length=50 μm), and the solvent was evaporated in air at 22° C.

The resistance characterization of the fiber muscle was performed in a custom setup. To evaluate the piezoresistive response, one end of the fiber-based muscle was connected to a DC motor, and a voltage divider was used to record the resistance change. A square pulse was supplied to the DC motor from the function generator (Keysight 33210A Function Generator), and a data acquisition card was used to record the change in the resistance (DATAQ Instruments DI-1100) as modulated during fiber compression and extension.

Tendril-inspired design of fiber-based artificial muscle—Plants employ several types of movements to best utilize available sunlight, an interesting example of which is observed in cucumbers. Cucumbers use their tendrils as a wandering organ to find a rigid surface such as a pole or stick, to which the tendrils attach themselves. Then, the tendrils start coiling from the two ends in opposite directions. In the middle, where the two coils of opposite chirality meet, a region forms which Charles Darwin dubbed a "perversion". This phenomenon (shown in FIG. 7) is explained by differential swelling of g-fibers along the tendril organ.

Materials and shape selection for fiber-based actuators—Fiber-based bimorph actuators rely on a pair of materials with mismatched thermomechanical properties: a high-performance engineering material and an elastomer that can be drawn simultaneously. The latter imposes constraints on their viscosities at the drawing temperature, and hence the glass transition and melting points. While numerous engineering polymers are thermoplastics, elastomers compatible with thermal drawing present a sparser class. To our knowledge, the readily commercially available drawing elastomers are cyclic olefin copolymer elastomer (COCe), thermoplastic polyurethane (TPU), and styrene ethylene butylene (SEBS). COCe has the lowest coefficients of thermal expansion (CTE) when compared to TPU and SEBS (~26×10$^{-6}$ K$^{-1}$, ~200 10$^{-6}$ K, 160 10$^{-6}$ K$^{-1}$, respectively). Besides, TPU and SEBS possess significantly high melting temperature as compared to the glass transition/melting point of the engineering non-elastomeric thermoplastics and are challenging to implement in a stable high-throughput drawing. Consequently, COCe was chosen as an elastomer ($T_m$=84° C.), and polyethylene (PE) was selected at an appropriate density to match the melting temperature of the latter ($T_m$=~120° C.). PE was also chosen for its high thermal expansion coefficient (108-200 10$^{-6}$ K$^{-1}$) as compared to other polymers with similar $T_g$ values (Table 1).

TABLE 1

Polymers used in the fiber drawing.

| Polymers | $T_g$ (° C.) | $T_m$ (° C.) | CTE (10$^{-6}$K$^{-1}$) |
|---|---|---|---|
| *SEBS | −57.4 | 200-240 | ~200 |
| *TPU | ~−40 | 190-240 | ~160 |
| *COCe | 6 | 84 | ~26 |
| PE | −120 | ~120 | 108-200 |
| PMMA | 105 | 160 | 70-77 |
| PEI | 225 | — | 56 |
| PES | 220 | — | 55 |
| PSU | 190 | — | 56 |
| PVDF | −35 | 177 | 80-140 |

*Elastomers. PMMA: Poly(methylmethacrylate), PEI: Polyetherimide, PES: Polyethersulfone, PSU: Polysulfone, PVDF: Polyvinylidene fluoride.

The actuation of the bimorph structure composed of PE and COCe layers was simulated in a 2D COMSOL model as shown in FIG. 8A. The thickness of each layer was 250 μm, with a length of 15 cm. The fiber was fixed from one end and free on the other end, with no-slip boundary conditions used at the interface of the two components. In the steady state mode, the temperature applied from the fixed end was set to 60° C. Solid mechanics and heat transfer modules were solved in parallel in order to solve the bimorph thermal actuation problem. As a result of the simulations, the highest displacement as 10.5 cm (displacement of the free end of the fiber) was obtained. FIG. 8B shows the different cross-sectional geometries used during the design optimization process.

Pairing COCe and PE in equal halves to form an actuator, different cross sectional shapes with the same cross-sectional area and length, 0.25 mm² and 15 cm, respectively were tested. To test the effect of the cross-section, a 3D model was made using the same parameters and modules that were used in the 2D simulations. Table 2 shows that the maximum displacement was achieved with the elliptical and rectangular shapes. Since fabricating elliptical preforms is complicated compared to rectangular preforms, a rectangular cross-section was used in the artificial muscle design.

TABLE 2

Maximum displacement values of differently-shaped actuators. The effect of the cross-section shape (circle, ellipse, rectangle, and square) on actuator performance was tested for the COCe/PE bimorphs.

| Cross-section shape* | Dimensions (μm) | Displacement (cm) |
| --- | --- | --- |
| Ellipse | $r_1$: 199, $r_2$: 400 | 11.18 |
| Rectangle | a: 425, b: 600 | 9.60 |
| Circle | r: 282 | 8.89 |
| Square | a: 500 | 7.68 |

*For all cross-sections, length: 15 cm, cross-sectional area: 0.25 mm²

The sharp corners in the preforms are naturally rounded after conducting the drawing process under high tension. A similar effect was observed in these fibers, where the rectangular cross-section was deformed into ellipse-like shapes after the fiber drawing process.

Preform fabrication for artificial muscle fibers and the fiber drawing process—An enlargement of our optimized fiber geometry, called a preform, was fabricated in two successive stages: machining and sizing the elements of the preform, and consolidation of the elements. Initially, two 8×25×200 mm³ slabs were machined, one of COCe and one of PE, using a milling machine and a grinder. PMMA slabs with grooves for placing the PE and COCe slabs were machined as cladding. Preform fabrication details and preform dimensions are shown in FIG. 9. The slabs of COCe and PE were sandwiched between two PMMA layers and consolidated using a hot press under 50 bar pressure for 8 hours at 100° C. and 4 hours at 125° C. During the consolidation process, the PMMA layer encapsulated the PE and the COCe slabs while they were bonded together with the help of the elevated temperature and applied pressure. Lastly, before removing the applied pressure, the temperature was reduced to <80° C. It is important to note that there was no compensation pressure used for the consolidation process.

The consolidation at elevated temperature and pressure ensured strong adhesion between the COCe and PE layers, such that the separation could only be achieved by machining and the fracture of the individual materials occurred at a similar rate to the separation at the interface. This strong adhesion between the layers underlined our assumptions of nonslip interfaces within this study.

The final preforms were stretched in the fiber tower (also sometimes referred to as a "drawing tower") at 290-310° C. using 1 mm/min feed speed and 2-3 m/min drawing speed. The adhesion between the layers further increases during fiber drawing due to increased compression at the necking region of the preform.

To further reduce the size of the fibers/muscles, the iterative size reduction technique was used. A second preform was prepared with 4 mm by 4 mm inner dimensions, stacked the 400 μm thick fibers into the new preform, and pulled it in the fiber tower. The preform made of stacked first step fibers is shown in FIG. 10. Since the first step fibers were designed as a thermal actuator, they contracted during the second step of fiber drawing due to drawing temperature. Therefore, the number of fibers that could be drawn in the second step was limited to 20 first step fibers. As shown in FIGS. 11A-11B, upon drawing more than 20 first step fibers, the fibers contracted strongly. Although the fibers in the preform were sealed from both ends, they were able to free themselves and break the preform during the fiber drawing process.

Figure 12A:
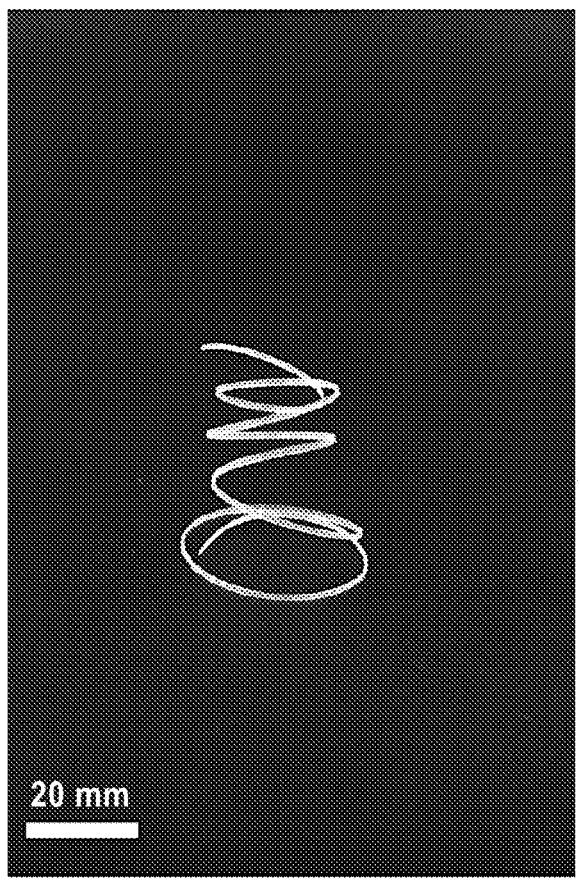
FIG. 12A illustrates how, after mechanically removing the PMMA cladding, artificial-muscle fibers took on a helical shape due to strain mismatch at the boundary of COCe and PE and deformation during the fiber drawing process.
Figure 12B:
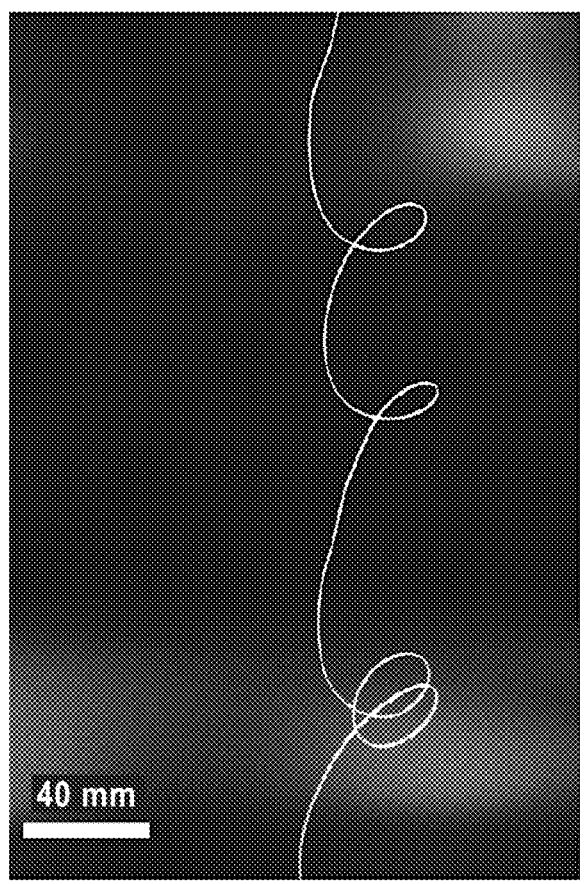
FIG. 12B illustrates that perversion formation and helical formation were clear upon extending the fiber.

After the fiber drawing, the muscle fibers were encapsulated in the PMMA cladding, which could be mechanically removed. After stripping the PMMA jacket, the fiber muscle took on a coil shape due to strain mismatch at the COCe/PE boundary and the applied deformation during the fiber drawing (FIGS. 12A-12B).

Figure 13A:
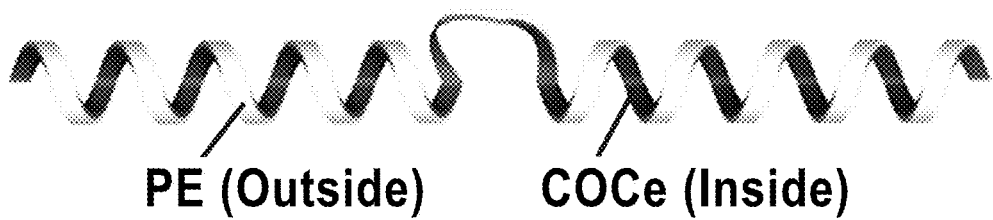
FIG. 13A illustrates how, after applying strain, an artificial muscle fiber takes on a spring shape. COCe occupies the inner surface and PE occupies the outer surface of the springs.
Figure 13B:
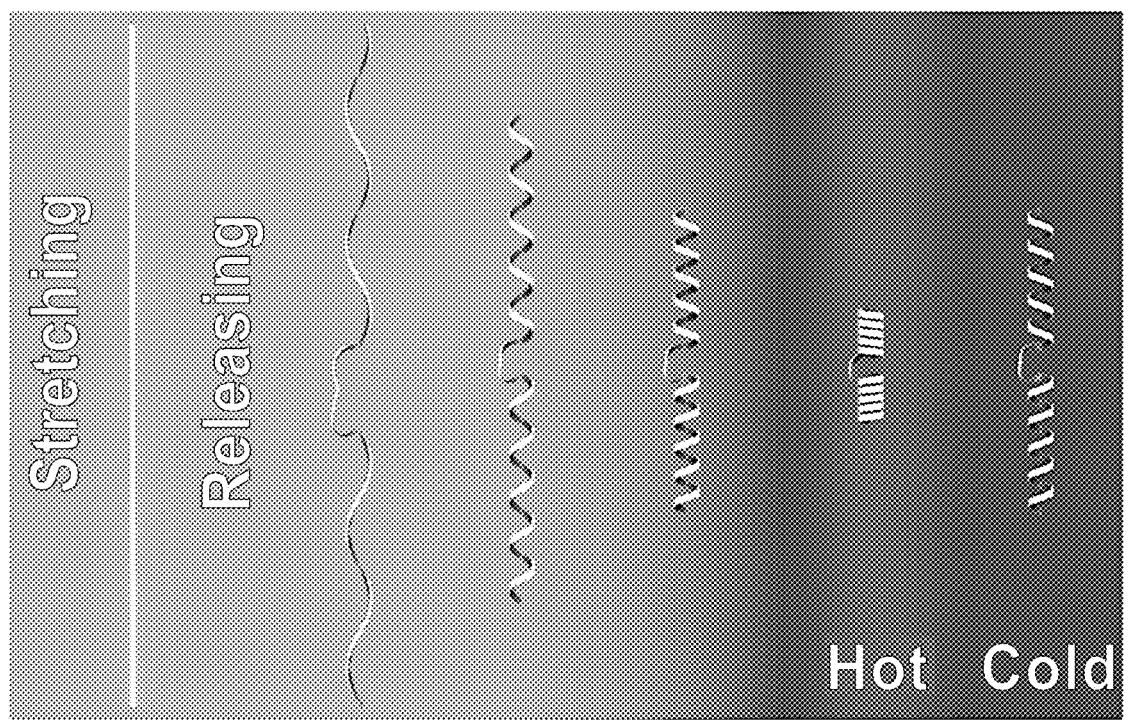
FIG. 13B illustrates that the fiber-based springs are actuated by a change in the temperature.

Formation of springs during the cold drawing of the bimorph fibers—As shown in FIG. 13A, after cold drawing COCe always assumes the interior surface of the springs, while the PE occupies the exterior surface. This is due to the mismatch between the mechanical properties of the components. Elastic energy storage and release capacity of stretchable COCe is higher than the non-stretchable PE. Non-stretchable PE deforms plastically, while the elastomeric COCe deforms elastically. After a cold drawing process, COCe releases the stored elastic energy and attempts to return the original dimensions, while PE undergoes plastic deformation. This mechanical mismatch leads to spring formation (FIG. 13B).

Thermal actuation—Irrelevant from the chirality, heating always causes a contraction (negative thermal response). The actuation is achieved through further expansion of PE (on the external surface) with respect to COCe upon application of a thermal stimulus (FIGS. 13A-13B). During thermal actuation only the tightness of the windings changes, while the number of the turns and their direction stays the same, allowing for linear actuation (see FIG. 1H, Kirchhoff's theory of thin rods section below, and FIGS. 15A-15D).

Kirchhoff's theory of thin rods—To describe the formation of perversions and model the actuation behavior of the bimorph fibers, Kirchhoff theory of thin rods was employed, that relies on the existence of an intrinsic curvature of the unstrained rod's centerline space-curve, which in our experiment stems from strain imparted during the cold drawing of the precursor fibers and during their thermal actuation. Below a critical tensile load, the rods bifurcate to form perversions (FIGS. 14A-14C), the shape and the number of which can be obtained via stability analysis (FIGS. 15A-15D).

The large mismatch between the axial and cross-sectional dimensions of the fibers suggests that the problem description was unaffected by a translation along the fiber's axis.

Practically, this allows one to measure the two dimensions in different length units, which introduces an extended-based system from a dimensional-analysis perspective. This length-decoupling hints at the Kirchhoff theory for thin rods as the natural language for analytical modelling.

Let the elastic rod, of length L, be modeled as an inextensible, un-shearable ribbon, defined by a smooth space curve, x (s, t) and a unit basis vector, $d_3$ (s, t), as shown in FIGS. 14A-14C. Here, s parameterizes the arc length of the ribbon, constrained by the inextensibility assumption so that $s \in [0, L]$, and t is the time. The rod kinematics are described by a director basis, $$(d_1, d_2, d_3) = (d_1(s,t), d_2(s,t), d_3(s,t)) \quad (1)$$

where the unit basis vector, $d_3 = x'$, is the tangent vector to the space-curve, and $$(\cdot)' \equiv \partial(\cdot)/\partial s, (\dot{\cdot}) \equiv \partial(\cdot)/\partial t$$

The director basis must remain orthonormal in both space and time, implying the existence of a twist vector K and a spin vector ω given by $$d_i' = \kappa \times d_i, i=1,2,3 \quad (2)$$

$$\dot{d}_i = \omega \times d_i, i=1,2,3 \quad (3)$$

Linear (force) and angular momentum balance acting on the cross-section to the director basis give rise to Kirchhoff's equations $$F'' - \rho A \ddot{d}_2 = 0 \quad (4)$$

$$M'' + d_3 \times F = \rho(I_2 \dot{d}_1 + \dot{d}_1 + I_1 d_2 \times \dot{d}_2) = 0 \quad (5)$$

where ρ is the (constant) mass per unit volume of the rod and A=πab is the area, $I_1 = \pi ab^3/4$, $I^2 = \pi a^3 b/4$ are the principal moments of inertia of the elliptical cross section with semi-axes a and b. The Kirchhoff equations can then be closed by invoking the constitutive relation of linear elasticity $$M = EI_1(\kappa_1 - \kappa_1^{(u)})d_1 + EI_2(\kappa_2 - \kappa_2^{(u)})d_2 + GJ_1(\kappa_3 - \kappa_3^{(u)})d_3 \quad (6)$$

where E is Young's modulus, G is the shear modulus, $$J \approx \frac{\pi a^2 b^2}{a^2 + b^2}$$

is the (geometry-dependent) torsion constant, and $\kappa^{(u)} = \kappa_1^{(u)} d_1 + \kappa_2^{(u)} d_2 + \kappa_3^{(u)} d_3$ is the rod's intrinsic curvature.

Stability analysis—The stability of the exact solutions of the Kirchhoff equations can be assessed under small perturbations of initial conditions. Rigorously, this can be expressed as a power series, expanding in a small parameter E of the director basis and the force components as $$d_i' = d_i^{(0)} + \epsilon d_i^{(1)} + \epsilon^2 d_i^{(2)} + \ldots i=1,2,3 \quad (7)$$

$$F_i' = F_i^{(0)} + \epsilon F_i^{(1)} + \epsilon^2 F_i^{(2)} + \ldots i=1,2,3 \quad (8)$$

where the condition of orthonormality allows expression of high order terms in terms of the unperturbed director basis $d_i^{(0)}$ and force components $F_i^{(0)}$ to give (to second order)

$$d_i^{(1)} = \Sigma_j A_{ij}^{(1)} d_j^{(0)} \quad (9)$$

$$d_i^{(2)} = \Sigma_j (A_{ij}^{(2)} + s_{ij}^{(2)}) d_j^{(0)} \quad (9)$$

where $A^{(k)}$ and $S^{(k)}$ are antisymmetric and symmetric coefficient matrices, respectively. Defining the stationary configuration as the six-vector, $$\mu^{(0)}(\alpha_1^{(0)}, \alpha_2^{(0)}, \alpha_3^{(0)}, F_1^{(0)}, F_2^{(0)}, F_3^{(0)})$$

equations (4) and (5) can be solved to second order $$O(\epsilon^{(0)}): E(\mu^{(0)}) = 0 \quad (11)$$

$$O(\epsilon^{(1)}): L(\mu^{(0)}) \cdot \mu^{(1)} = 0 \quad (12)$$

$$O(\epsilon^{(2)}): L(\mu^{(0)}) \cdot \mu^{(2)} = H_2(\mu^{(1)}) \quad (13)$$

In modelling experiments, one can consider a straight rod under uniaxial tension, which in its unstressed state, exhibits intrinsic curvature, K (but no intrinsic twist or torsion)

$$(F_1^{(0)}, F_2^{(0)}, F_3^{(0)}) = (0,0,P); (\kappa_1^{(u)}, \kappa_2^{(u)}, \kappa_3^{(u)}) = (K,0,0) \quad (14)$$

The stability analysis carried out to second order illustrates a bifurcation instability of the straight rod, below a critical value of the tensile load, given by $$P_{crit} = \frac{(EI_2 K)^2}{GJ} - EI_2 \left(\frac{n\pi}{L}\right)^2 \quad (15)$$

with the following position vector for bifurcation mode n $$x_n = \begin{pmatrix} \frac{-GJX_n \sin(\omega_n s)}{EI_1 K} \\ \frac{G^2 J^2 (2E_1 + EI_2 - Gj) X_n^2 \omega_n^2 (\cos(2\omega_n s) - 1)}{2E^2 I_1^2 K^2 + 2E^2 GI_2 (4I_2 - I_2) JK \omega_n^2} \\ S - \frac{G^2 J^2 X_n^2 \omega_n \sin(2\omega_n s)}{4E^2 I_1^2 K^2} \end{pmatrix} \quad (16)$$

where $X_n$ is the mode amplitude (and is a function of the applied tensile load) and $\omega_n = n\pi/L$ is the mode angular frequency. FIGS. 14A-14C, 15A-15D illustrate the bifurcation instability and the exact rod shape for various bifurcations, respectively.

Thermoelasticity—The solutions presented above rely on the unstressed rod having an intrinsic curvature. This can be achieved in a bilayer strip, like the one investigated here, in multiple ways. During the initial stretching step, this is achieved due to a mismatch of lengths and pre-strains of the two strips of the bilayer; this can also be achieved using a temperature differential when the two strips exhibit a thermal expansion coefficient mismatch.

In this section, the intrinsic curvature is derived as a consequence of thermoelasticity in such a bilayer with an elliptical cross-section, as seen in FIGS. 13A-13B. If $\alpha_2 > \alpha_1$, a positive temperature differential will lead to the top layer stretching more than the bottom layer. The two layers are assumed to be perfectly bonded to each other, and thus the whole strip will bend with equal and opposite axial forces on each layer. Linear and angular momentum balance then yields $$P_1 = P_2 = P = 2(M_1 + M_2)/h \quad (17)$$

where each bending momentum can be expressed as $$M_i = \int_{-t/2}^{t/2} y dF = \frac{E_i}{R} \int_{-t/2}^{t/2} y^2 dA = \frac{E_i I_i}{R} \quad (18)$$

by substitution of the stress-strain constitutive relation and the identification of the area moment of inertia. This simplifies (SI-17) to read $$P = \frac{h}{2} = M_1 + M_2 = \frac{E_1 I_1 + E_2 I_2}{R} \quad (19)$$

As postulated above, the tensile and compressive bending forces P are a result of the thermoelastic strain in each layer given by $$\gamma_1 = \alpha_1 \Delta T + \frac{P}{A_1 E_1} + \frac{t_1}{2R} \quad (20)$$

$$\gamma_2 = \alpha_2 \Delta T - \frac{P}{A_2 E_2} - \frac{t_2}{2R} \quad (21)$$

Since no slipping occurs at the interface, $\gamma_1 = \gamma_2 = \gamma$, which can also be derived geometrically to be $$\gamma = \frac{\Delta L}{L} = \frac{\theta(R+y) - \theta R}{\theta R} = \frac{y}{R} = \frac{h}{2R} \quad (22)$$

Substituting equation 19 into equations 20 and 21, equating with equation 22 and using the cross-sectional areas and principal area moments for an elliptical section, yields the final thermoelasticity-induced intrinsic curvature:

$$K = \frac{1}{R} = (\alpha_2 - \alpha_1)\Delta T \frac{4 E_1 E_2}{b(E_1^2 + 10 E_1 E_2 + E_2^2)} = \frac{(\alpha_2 - \alpha_1)\Delta T}{b} \quad (23)$$

The last equality in equation 23 for $E_1 = E_2$ illustrates the linear dependence of the intrinsic curvature on the temperature differential as seen in FIGS. 14A-14C.

Avoiding perversions—Perversions occur stochastically and repeatedly in meters of continuous fibers and eliminating them from fibers longer than 20 cm is challenging as seen from the Kirchhoff theory and Stability analysis sections. Nevertheless, developed here are several techniques for avoiding the perversion formation in fibers 10-20 cm long. One method is twisting the fibers in the opposite direction of the chirality of the springs on both sides prior to fiber release following cold drawing. This process, however, has limited reproducibility. A robust approach for eliminating perversions in 10-20 cm fibers involves the simultaneous rapid release of both fiber ends following cold drawing. In this case, both ends of the fiber are allowed to move freely, avoiding the formation of sections with opposing chirality.

Figure 18A:
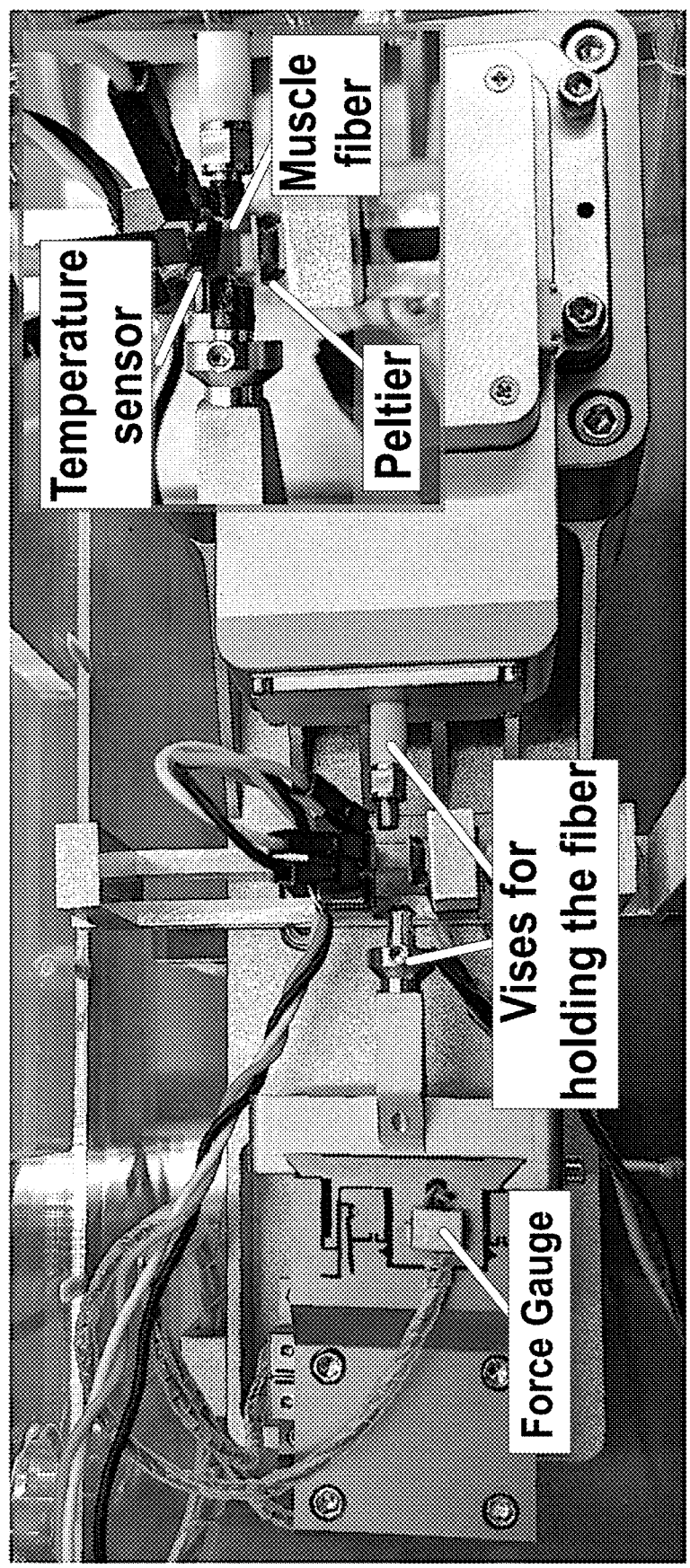
FIG. 18A is a photo of a setup for miniature fiber force characterization setup.
Figure 18C:
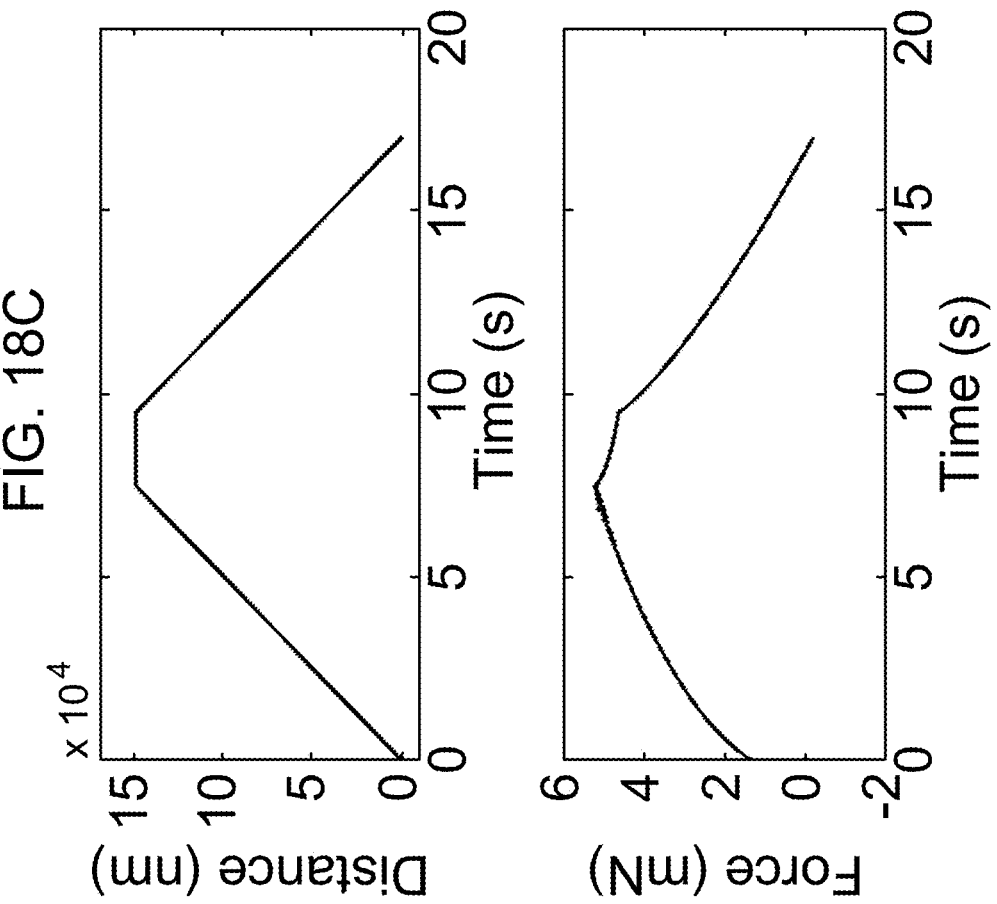
FIG. 18C shows sample results showing the change in the force (lower panel) with the change in the distance (upper panel).
Figure 18B:
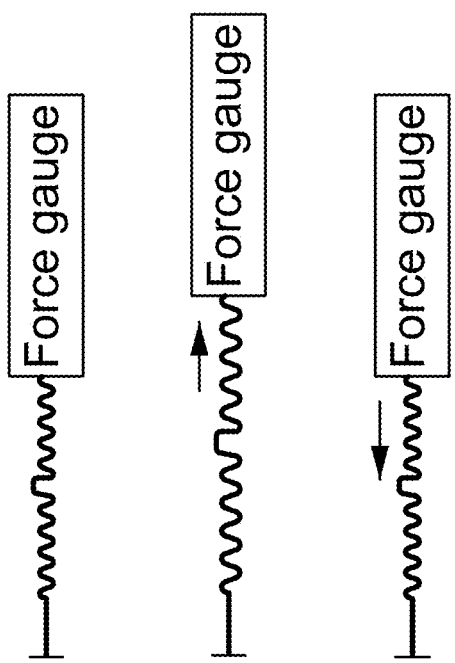
FIG. 18B is an illustration of the experiment flow in a miniature fiber force characterization. The force gauge first stretches the fiber and then releases it. The power-to-mass ratio formula used in the calculation uses the generated force ($\Delta F$), the distance ($\Delta x$), and the time 5 ($\Delta t$), as well as the mass of the microfiber (m).

Characterization of fiber-based artificial muscles—The generated force of the thermally actuated muscle fibers was characterized using a custom-made force measurement setup. Two linear stages were built to adjust the position of the force gauge and vises for holding the muscle fiber. A force gauge (Nidec-Shimpo FG7000) was fixed on one of the linear stages and the long vise was connected to the transducer input (FIG. 16). Another vise was fixed on to the linear stage on the opposite side. The muscle fiber was strained between the vise holders and the length and pre-stress were adjusted via linear stages. An adjustable light source (Sylvania Capsylite Par30 75 W 120V NSP) was used for photo-thermal heating of the fiber and a temperature sensor (TMP36) was located beneath the muscle fiber. The change in the temperature was controlled by the light's intensity, its distance from the fiber, and exposure time. Fibers (300×470 µm$^2$) were strain programmed (maximum strain of 700%, 50 mm/min deformation rate) before force measurements and trimmed down to 5 cm lengths. Photo thermal illumination was in 3 second pulses with 10 second delays. A temperature gradient of 3.45±0.43° C./s triggered a force of 36.23±5.42 mN. Light pulses were generated using KEYES 5V Relay Module and duty cycles were controlled using Arduino UNO. Because the second step fibers were very small (FIGS. 17A-17F), they generated smaller forces, which were not feasible to detect with our custom-made force measurement setup. Thus, a Hysitron PI-88 Picoindenter system was used but a heating source and a temperature sensor was added to the setup (FIGS. 18A-18C). The artificial microfiber was heated using a micro-Peltier (TE Technology Micro Modules), which was placed 1 mm away from the fiber. A temperature sensor (TMP36) was also placed 1 mm away from the muscle fiber to measure the temperature gradient. Actuator attributes for different size of fibers were given in Table 3.

TABLE 3

Actuator attributes for different size of fibers. The effect of the cross-sectional area, shape, spring index, number of turns per centimeter on actuator performance. The density of the bimorph structures is 0.985 g/cm$^3$. All fibers were 2 cm long and produced by application of ~700% strain at a rate of 50 mm/min.

| Actuator Attributes | | | |
|---|---|---|---|
| Cross-selection area, µm$^3$ | 100 × 156 | 200 × 312 | 400 × 625 |
| Actuator weight, mg | 0.36 | 1.4 | 5.7 |
| Turns per centimeter | 12 | 10 | 6 |
| Spring index | 5.5 | 5 | 6 |
| Maximum actuation stress, MPa | 5 | 1 | 0.25 |
| Maximum actuation strain, % | 47.7 | 42.4 | 41.9 |
| Maximum actuator modulus, MPa | 10.64 | 2.38 | 0.60 |
| Maximum work capacity, kJ/kg | 7.42 | 1.45 | 0.359 |
| Actuator efficiency, % | 0.60 | 0.76 | 1.12 |

Weight-lifting performance of fiber muscle bundles—An artificial bicep was built by combining 100 fibers (300×470 µm$^2$ cross-section) in an oblique fashion (FIG. 19A). It was observed that artificial bicep can repeatedly be stretched (FIGS. 19B-19C).

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
    drawing a first fiber from a set of substances, the set of substances including:
        an elastomer having a first thermal expansion coefficient; and
        a glassy polymer having a second thermal expansion coefficient that is higher than the first thermal expansion coefficient;
    drawing a second fiber from the first fiber, the second fiber having a lower cross-sectional area than the first fiber; and
    extending and then releasing, at an ambient temperature, the second fiber to induce plastic deformation in the glassy polymer and to increase strain in the second fiber.

2. The method of claim 1, wherein drawing the first fiber includes applying heat to the first fiber, and wherein the elastomer and the glassy polymer each have a viscosity from about 0.1 Pa·s to about $10^4$ Pa·s at a drawing temperature associated with the drawing.

3. The method of claim 1, wherein the elastomer is selected from the group consisting of a cyclic olefin copolymer elastomer, a thermoplastic polyurethane, and poly (styrenebutadiene-styrene).

4. The method of claim 1, wherein the glassy polymer is selected from the group consisting of polyethylene, chlorinated polyethylene, a polysulfone, a polyether sulfone, polyphenylsulfone, a polycarbonate, polyvinylidene fluoride, and a polyurethane.

5. The method of claim 1, wherein the set of substances further includes a cladding material.

6. The method of claim 5, wherein the cladding material is poly(methyl methacrylate).

7. The method of claim 1, the second fiber having a cross-sectional area from about 1 $\mu m^2$ to about 250 $\mu m^2$.

8. The method of claim 1, further comprising, prior to drawing the first fiber, creating a preform from the set of substances by encapsulating a slab of the elastomer and a slab of the glassy polymer collectively in a cladding material, and wherein drawing the first fiber includes drawing the first fiber from the preform.

9. The method of claim 8, further comprising annealing, prior to the drawing the first fiber, the preform.

10. The method of claim 8, wherein the cladding material is a first cladding material, drawing the first fiber includes drawing a set of first fibers, and drawing the second fiber includes drawing a set of second fibers, each second fiber of the set of second fibers corresponding to a first fiber of the set of first fibers, and further including encapsulating the set of first fibers collectively in a second cladding material prior to drawing the set of second fibers.

11. The method of claim 10, each first fiber of the set of first fibers having an average cross-sectional area from about 0.0025 mm$^2$ to about 25 mm$^2$.

12. The method of claim 10, each first fiber of the set of first fibers having a length from about 1 m to about 10,000 m.

13. The method of claim 10, wherein the set of first fibers includes from 2 first fibers to 400 first fibers.

14. The method of claim 10, further comprising removing, prior to the extending, the first cladding material and the second cladding material from the set of second fibers.

15. The method of claim 1, wherein extending and then releasing the second fiber includes inducing a strain from about 50% to about 1300% in the second fiber.

16. The method of claim 1, wherein extending and then releasing the second fiber includes deforming the second fiber at a deformation rate from about 10 mm/min to about 50 mm/min.

17. The method of claim 1, wherein extending and then releasing the second fiber includes simultaneously releasing both ends of the fiber to avoid formation of perversions.

18. A method, comprising:
drawing a first fiber from a preform including applying heat to the preform during the drawing of the first fiber, the preform including:
a first slab of an elastomer having a first thermal expansion coefficient;
a second slab of a glassy polymer having a second thermal expansion coefficient that is higher than the first thermal expansion coefficient; and
a cladding layer encapsulating the first slab and the second slab;
drawing a second fiber from the first fiber including applying heat to the first fiber during the drawing of the second fiber;
extending and then releasing, at a temperature lower than a melting temperature of the elastomer and lower than a melting temperature of the glassy polymer, the second fiber to induce plastic deformation in the glassy polymer, such that strain is increased in the second fiber due to elastomeric contraction of the elastomer, including simultaneously releasing both ends of the second fiber to avoid the formation of perversions.

19. The method of claim 18, further comprising, prior to drawing the first fiber, creating the preform by encapsulating the first slab of the elastomer and the second slab of the glassy polymer collectively in the cladding layer.

20. The method of claim 18, wherein the cladding layer is a first cladding layer, drawing the first fiber includes drawing a set of first fibers, and drawing the second fiber includes drawing a set of second fibers, each second fiber of the set of second fibers corresponding to a first fiber of the set of first fibers, and further including encapsulating the set of first fibers collectively in a second cladding layer prior to drawing the set of second fibers.

* * * * *